(12) United States Patent
Liu et al.

(10) Patent No.: US 10,649,713 B1
(45) Date of Patent: May 12, 2020

(54) CALIBRATING MULTIPLE DISPLAYS OF A COMPUTING DEVICE TO HAVE A SIMILAR PERCEIVED APPEARANCE

(71) Applicant: Dell Products L. P., Round Rock, TX (US)

(72) Inventors: Yung Chun Liu, Taipei (TW); Jace W. Files, Round Rock, TX (US); Gerald Rene Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/245,583

(22) Filed: Jan. 11, 2019

(51) Int. Cl.
  *G06F 3/14* (2006.01)
  *G06F 3/0354* (2013.01)
  *G06F 3/041* (2006.01)

(52) U.S. Cl.
  CPC ........ *G06F 3/1446* (2013.01); *G06F 3/03542* (2013.01); *G06F 3/03545* (2013.01); *G06F 3/0412* (2013.01)

(58) Field of Classification Search
  CPC .................. G06F 3/03545; G06F 3/03542
  See application file for complete search history.

(56) References Cited

U.S. PATENT DOCUMENTS

| | | | |
|---|---|---|---|
| 2011/0198134 A1* | 8/2011 | Chen ................ | G06F 3/03545 178/19.05 |
| 2014/0101579 A1* | 4/2014 | Kim ................. | G06F 3/04845 715/761 |
| 2014/0152576 A1* | 6/2014 | Kim ................. | G06F 1/1677 345/169 |
| 2016/0357274 A1* | 12/2016 | Ahn ................. | G06F 3/0383 |

* cited by examiner

*Primary Examiner* — Kevin M Nguyen
(74) *Attorney, Agent, or Firm* — Campbell Stephenson LLP; Shiv S. Naimpally

(57) ABSTRACT

In some examples, a stylus determines that an end cap was removed from an end of the stylus and notifies a computing device. In response, the computing device initiates a calibration process that includes displaying a pattern on a first display device of the computing device. The stylus gathers first data when the end of the stylus traces the pattern and sends the first data to the computing device. The computing device stops displaying the pattern on the first display device and begins displaying the pattern on a second display device of the computing device. The stylus gathers second data when the end of the stylus traces the pattern and sends the second data to the computing device. The computing device uses the first data and the second data to calibrate the first display device and the second display device to reduce perceived color and intensity differences.

20 Claims, 16 Drawing Sheets

CALIBRATING MULTIPLE DISPLAYS OF A COMPUTING DEVICE TO HAVE A SIMILAR PERCEIVED APPEARANCE

BACKGROUND OF THE INVENTION

Field of the Invention

This invention relates generally to computing devices and, more particularly, to configuring multiple display devices of a portable computing device to provide a same (or similar) perceived appearance (e.g., in terms of color balance).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a user views content on a portable computing device having multiple display devices, the content may appear disjointed if the perceived colors displayed by one display device differs from the perceived colors displayed by at least one of the other display devices. This may be due to several reasons, including variations that are within manufacturing tolerances and ambient lighting. For example, two display devices may be within manufacturing tolerances but be perceived as displaying different colors. As another example, depending on where a light source is located, a first display device may receive direct light while a second display device may receive indirect light, causing a difference in the perceived colors displayed by the two display devices.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a stylus determines that an end cap was removed from an end of the stylus and notifies a computing device. In response, the computing device initiates a calibration process that includes displaying a pattern on a first display device of the computing device. The stylus gathers first data during a time when the end of the stylus is used to trace the pattern being displayed on the first display device. The stylus sends the first data to the computing device. In response, the computing device stops displaying the pattern on the first display device and begins displaying the pattern on a second display device of the computing device. The stylus gathers second data during a time when the end of the stylus is used to trace the pattern being displayed on the second display device and sends the second data to the computing device. The computing device uses the first data and the second data to calibrate (e.g., modify one or more of a gamma setting, a chroma setting, or a luma setting of) the first display device and/or the second display device to reduce a perceived color and intensity difference.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
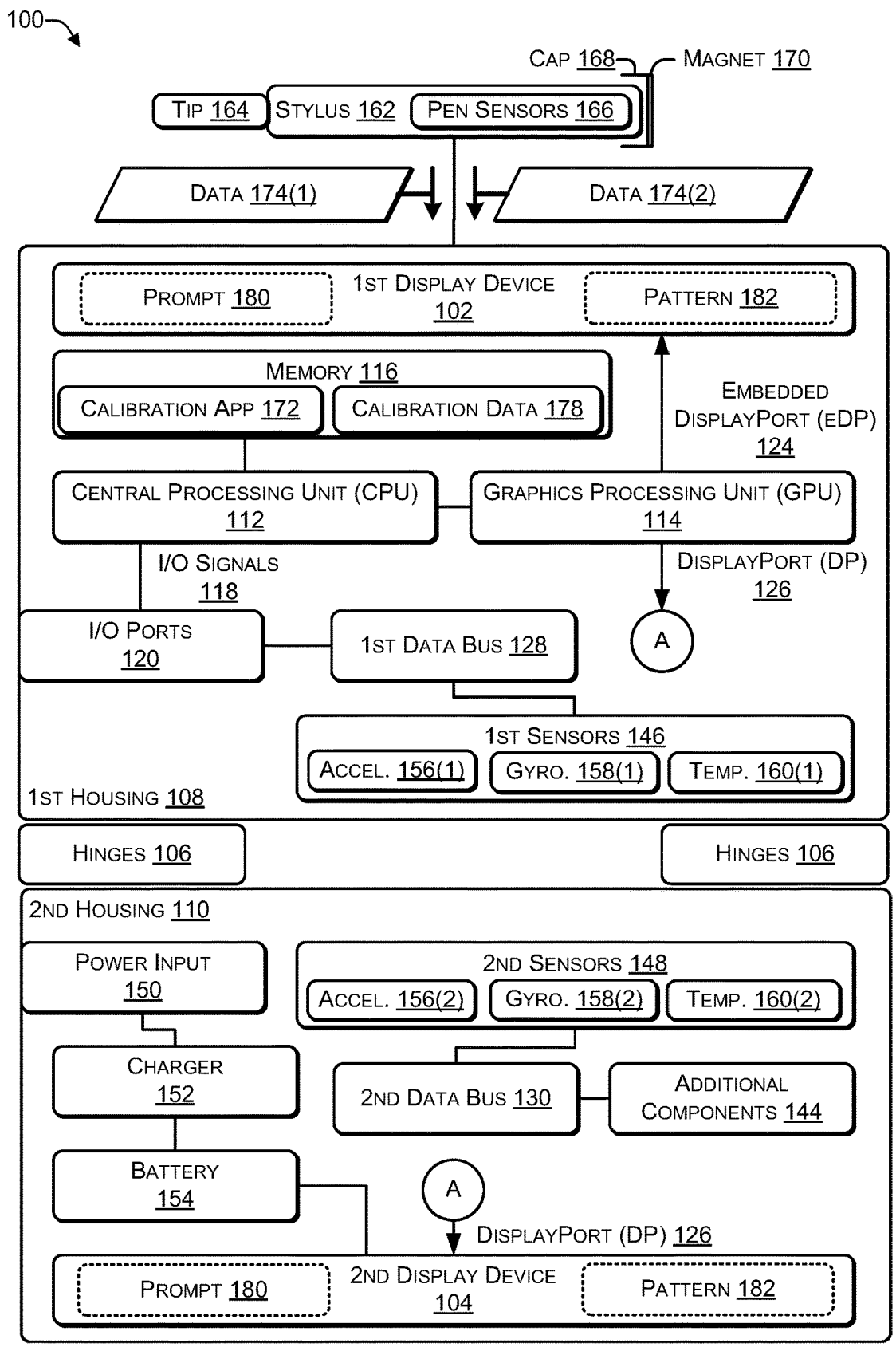
FIG. 1 is a block diagram of an architecture of a computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

An operating system may configure multiple display devices to behave as a single display device. For example, content (e.g., an application, a movie, or the like) may be displayed across the multiple display devices. When a portable computing device, such as a phone or tablet, includes multiple (two or more) display devices, the content being displayed across the multiple display devices may appear disjointed if the perceived colors displayed by one display device differ from the perceived colors displayed by another of the display devices. For example, a first display device may be at one end of a manufacturing tolerance while a second display device may at another end of the manufacturing tolerance, resulting in a perceived difference between the two display devices. As another example, a first display device may receive direct light while a second display device may receive indirect light, causing a difference in the perceived colors displayed by the two display devices. As yet another example, the first display device may receive light from a first light source and the second display device may receive light from a second light source. To illustrate, when a user is sitting near a window inside a building (e.g., home or workplace), the first light source may be the lighting used in the building (e.g., incandescent, fluorescent, or another type of lighting) while the second light source may be sunlight filtered through the window. These examples illustrate that the user may perceive color variations, particular when content is being displayed across both display devices based on manufacturing tolerance variations, an amount of light being received, and the type of light source that is illuminating each display device.

In a portable computing device that includes multiple display devices, the various components (e.g., motherboard, memory, storage drive, battery, and the like) may be distributed among multiple housings, with each housing including one of the multiple display devices. For example, in a dual-display computing device, a first housing may be attached to a second housing by one or more hinges (or other mechanical coupling) that enable the first housing to be placed at an angle of between about 0 degrees to about 360 degrees relative to the second housing. In such a configuration, the motherboard, memory, and storage drive may be located in the first housing (behind the first display device) and the battery may be located in the second housing (behind the second display device). Some of these components may generate more heat than others, causing one housing to have a higher internal temperature (e.g., ambient temperature expressed in Celsius or Fahrenheit) than the other housing. In addition to manufacturing tolerances, an amount of light, and a type of light source, the difference in heat may cause one display device to display colors that are appear to a user to be different than the other display device.

The systems and techniques described herein use a stylus that includes one or more sensors, such as, for example, ambient light sensors (ALS) and color sensors, to determine the amount of ambient light falling on each display device and the perceived color. Based on this information, the computing device may determine modifications to settings (e.g., gamma, chroma, luma, and the like) of one or both of the display devices to reduce (or eliminate) perceived differences in colors and brightness between the two (or more) display devices. In some cases, multiple lookup tables (e.g., gamma lookup tables) may be used to determine a gamma value to apply to a first display device to reduce (or eliminate) a perceived color difference between the first display and a second display device. The multiple lookup tables may be pre-calculated. By pre-computing gamma values and creating multiple tables, much less computational power may be used by performing a table lookup for a gamma value during run time, e.g., instead of performing complex mathematical computations during run time.

A stylus may include an end with a tip that is used to simulate writing with ink on a touchscreen display device. The end opposite the tip may be used to house one or more sensors. An end cap may be used to cover and protect the sensors. The end cap may include a magnet that magnetically holds the end cap in place. The stylus may be associated with (e.g., paired to) a computing device. When a user physically removes the end cap, a hall effect sensor (or other magnetic sensor) located in the end of the stylus may detect that the sensors are exposed, indicating that the user desires to calibrate one or more display devices of the computing device. For example, when a user desires to calibrate the display device(s), (1) the computing device may prompt a novice user to remove the end cap from the stylus or (2) an experienced user may (without prompting) remove the end cap. The stylus may detect the removal of the end cap from the end of the stylus and send a message to a computing device that the end cap has been removed. In response, the computing device may automatically launch a calibration software application ("app"). The calibration app may display a pattern on the first display device and display a prompt instructing the user to use the stylus to trace the pattern being displayed on the first display device. When the user uses the stylus to trace the pattern, the sensors in the end of the stylus may gather sensor data. The stylus may send the sensor data to the computing device. In response, the calibration app may stop displaying the pattern on the first display device, display the pattern on the second display device, and display a prompt instructing the user to use the stylus to trace the pattern being displayed on the second display device. When the user uses the stylus to trace the pattern, the sensors in the end of the stylus may gather additional sensor data. The stylus may send the additional sensor data to the computing device. In response, the calibration app may stop displaying the pattern on the second display device. The calibration app may perform a comparison of the sensor data (of the first display device) with the additional sensor data (of the second display device) and determine (based on the comparison) calibration settings that reduce perceived differences in color and/or brightness between the first display device and the second display device. The calibration settings may be stored in memory and applied to the first display device and the second display device to reduce perceived differences and thereby improve the user's experience.

The user may be prompted to hold the stylus with the end of the stylus (e.g., that includes the sensors) facing down (e.g., each the display device) when tracing the pattern to calibrate color settings (e.g., gamma, chroma, luma, and the like). The user may be prompted to hold the stylus with the end of the stylus (e.g., that includes the sensors) facing up (e.g., away from each display device) when tracing the pattern to calibrate a brightness and contrast based on an amount and a type of ambient light that is striking a surface of each display device.

As a first example, a microcontroller unit (MCU) in a circuit of a stylus that includes a tip and an end may perform various operations. The stylus may include a lens to magnify and diffuse light entering into the end of the stylus before the light strikes one or more light sensors that are housed in the stylus. The stylus may include a light filter to filter out non-visible frequencies, such as frequencies below about 430 terahertz (THz) and above about 770 THz. The light filter may be used to filter light before the light strikes the one or more light sensors. For example, the operations may include receiving sensor data from a Hall effect sensor that is included in the stylus and determining, based on the sensor data, that an end cap that includes magnet has been removed from the end of the stylus. The operations may include sending a notification from the stylus to a computing device (e.g., that is paired to the stylus) indicating that the end cap has been removed. The notification may cause the computing device to initiate execution of a calibration application. The operations may include enabling one or more light sensors located in the end of the stylus. For example, the one or more light sensors may be transitioned from a low power consumption mode to an active mode. The operations may include determining that the end of the stylus is facing downward to capture light emanating from a display device. The operations may include collecting first data from the one or more light sensors when the stylus is placed over a first display device of a computing device. For example, collecting the first data from the one or more light sensors may include determining that the stylus is moving over an external surface of the first display device, initiating collection of the first data, determining that the stylus has stopped moving for more than a predetermined time period, and stopping collection of the first data. The operations may include sending the first data to the computing device. The operations may include collecting second data from the one or more light sensors when the stylus is placed over a second display device of the computing device. The operations may include sending the second data to the computing device. The first data and the second data may be used by a calibration app executing on the computing device to perform a color adjustment to at least one of the first display device or the second display device to reduce a perceived color difference between the first display device and the second display device.

As a second example, a stylus may include: a tip, a barrel located next to the tip, a toroidal-shaped cushion within and protruding from the barrel, and an end cap that can be placed over or removed from an end of the stylus that is opposite the tip. The barrel may include a circuit powered by at least one battery. The circuit may include (i) a microcontroller unit capable of executing logic instructions, (ii) a near field communication interface (e.g., Bluetooth®) to enable the stylus to wirelessly communicate with another device (e.g., computing device), (iii) one or more light sensors, (iv) a Hall-effect sensor, and (v) a gyroscope sensor to provide gyro data. For example, the microcontroller unit may determine an orientation of the stylus based on the gyro data. The toroidal-shaped cushion may be made using a material that can be dragged along an outer surface of a display device without permanently damaging the outer surface of the display device. The toroidal-shaped cushion may include an opening through which light travels to strike the one or more light sensors. The end cap may include a magnet. The microcontroller unit may determine a presence of the end cap on an end of the stylus based on the Hall effect sensor detecting the magnet that is located in the end cap. The microcontroller unit may determine a removal of the end cap from the end of the stylus based on the Hall effect sensor detecting an absence of the magnet that is located in the end cap. In some cases, a light filter may be located between the one or more light sensors and the toroidal-shaped cushion. The light filter may filter out frequencies below about 430 terahertz (THz) and above about 770 THz. In some cases, a lens may be located between the one or more light sensors and the toroidal-shaped cushion. the lens may magnify and/or diffuse the light before the light strikes the one or more light sensors. In response to the microcontroller unit determining that the end cap is placed over the end of the stylus and the tip is pointing downward, the stylus may enter a pen mode to enable the tip to be moved over a touchscreen display device to provide input. In response to the microcontroller unit determining that the end cap is placed over the end of the stylus and the tip is pointing upward, the stylus may enter an erase mode to enable the end of the stylus to be moved over the touchscreen display device to selectively remove previously provided input. In response to the microcontroller unit determining that the end cap has been removed from the end of the stylus and the tip is pointing upward, the stylus may enter a color calibration mode to enable the end of the stylus to be moved over the touchscreen display device to gather color data emitted by the touchscreen display device. In response to the microcontroller unit determining that the end cap has been removed from the end of the stylus and the tip is pointing downward, the stylus may enter an ambient light calibration mode to enable the tip of the stylus to be moved over the touchscreen display device to gather ambient light data associated with ambient light falling on the touchscreen display device.

As a third example, a computing device may include a first touchscreen display device, a second touchscreen display device, one or more processors, and one or more non-transitory computer-readable storage media to store instructions executable by the one or more processors to perform various operations. For example, the operations may include receiving a notification from a stylus that an end cap has been removed from an end of the stylus. For example, the end of the stylus may include a Hall effect sensor, the end cap may include a magnet, and a microcontroller unit in the stylus may determine that the end cap has been removed from the end of the stylus based on the Hall effect sensor determining an absence of the magnet. The stylus may be paired with the computing device using a near field communication technology (e.g., Bluetooth®). The end of the stylus may include one or more light sensors. The operations may include initiating execution of a calibration application based on receiving the notification. The operations may include displaying a pattern on the first touchscreen display device. For example, the pattern may include locations near four corners and a center of the first touchscreen display device. The operations may include displaying a prompt instructing the user to orient the stylus with the tip up and trace the pattern using the tip of the stylus. As the stylus is being used to trace the pattern displayed on the first touchscreen display device, the one or more light sensors in the end of the stylus may gather first data that measures the color rendering of the first touchscreen display device. The operations may include receiving the first data associated with the first touchscreen display device from the stylus, stopping displaying the pattern on the first touchscreen display device, and displaying the pattern on the second touchscreen display device. As the stylus is being used to trace the pattern displayed on the second touchscreen display device, the one or more light sensors in the end of the stylus may gather second data that measures the color rendering of the second touchscreen display device. The operations may include receiving the second data associated with the second touchscreen display device from the stylus. The operations may include determining one or more differences between the first data and the second data. The operations may include performing one or more color adjustments to at least one of the first touchscreen display device or the second touchscreen display device based on the one or more differences, thereby reducing a difference in a color rendering between the first touchscreen display device and the second touchscreen display device. For example, the one or more color adjustments may include adjusting one or more of a gamma value, a chroma value, or a luma value associated with at least one of: the first touchscreen display device or the second touchscreen display device.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 108 coupled to a second housing 110 via one or more hinges 106 (or other mechanical coupling mechanism). The hinges 106 may enable the two housings 108, 110 to be positioned at different angles relative to each other in different orientations (e.g., various vertical orientations and various horizontal orientations). Of course, additional housings may be attached via additional hinges (or other mechanical coupling mechanism) to create a computing device with multiple housings.

A first display device 102 may be located in the first housing 108 and, in some cases, a second display device 104 may be located in the second housing 110. A portion of the components of the computing device 100 may be located in the first housing 108 (e.g., behind the first display device 102) while a remainder of the components of the computing device 100 may be located in the second housing 110 (e.g., behind the second display device 104). For example, as illustrated in FIG. 1, the components located in the first housing 108 may include at least one central processing unit (CPU) 112, a graphics process unit (GPU) 114, and a memory (e.g., computer-readable media) 116. The GPU 114 may be integrated into the CPU 112 or may be a separate device from the GPU 114. The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a Thunder-Bolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 108 and two or more lanes of DisplayPort (DP) output 126 that are sent (e.g., wirelessly or via a cable) to the second display device 110 in the second housing 110.

A first data bus 128 in the first housing 108 and a second data bus 130 in the second housing 110 may distribute data among the various components of the computing device 100. For example, the data buses 128, 130 may distribute data from the I/O signals 118, the I/O ports 120, a first set of sensors 146, a second set of sensors 148, and additional components 144. For example, the data buses 128, 130 may distribute data by receiving data from a component of the computing device 100 and transmitting the data to one or more of the other components of the computing device 100.

The second housing 110 may include a remaining portion of the components of the computing device 100. In some cases, the components in the second housing 110 may be located behind the second display device 104. The second housing 110 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 108 with the components of the computing device 100 located in the second housing 110. In other cases, a first wireless transceiver in the first housing 108 and a second wireless transceiver in the second housing 110 may provide wireless communications between (1) the components of the computing device 100 located in the first housing 108 and (2) the components of the computing device 100 located in the second housing 110. The first set of sensors 146 may include one or more of an accelerometer 156(1), a gyroscope 158(1), an electronic compass (e-compass), a barometer, a magnetometer, a proximity sensor, a ambient temperature sensor 160(1) (e.g., to measure a ambient temperature within a predetermined distance of the first display device 102), a camera (or another type of imaging sensor), a fingerprint sensor, a global positioning satellite (GPS) sensor, a sensor to detect movement of (e.g., detect a change in an angle between) the hinges 106, a proximity sensor, another type of sensor, or any combination thereof. The second set of sensors 148 may include one or more of an accelerometer 156(2), a gyroscope 158(2), an electronic compass (e-compass), a barometer, a magnetometer, a proximity sensor, a temperature sensor 160(2) (e.g., to measure a ambient temperature within a predetermined distance of the second display device 104), a camera (or another type of imaging sensor), a fingerprint sensor, a global positioning satellite (GPS) sensor, a sensor to detect movement of (e.g., detect a change in an angle between) the hinges 106, a proximity sensor another type of sensor, or any combination thereof.

In FIG. 1, the first set of components of the computing device 100 shown as being located in the first housing 108 and the remaining set of components shown as located in the second housing 110 are purely for illustration purposes. Depending on the implementation, different components of the computing device 100 may be housed in one or both of the housings 108, 110. For example, when the computing device 100 is designed for graphics processing, the GPU 114 and supporting hardware (e.g., graphics support chips, graphics memory, and the like) may be housed in the second housing 110. As another example, in some cases, the ports 120 may be located in the first housing 108, in the second housing 110, or split between the two housings 108, 110. As a further example, the battery 154 may include multiple power cells, with a portion of the power cells located in the first housing 108 and zero or more of the power cells located in the second housing 110. In some cases, which components of the computing device 100 are located in each of the housings 108, 110 may be determined by the thermal characteristics of the components. For example, the components may be distributed between the housings 108, 110 to enable each of the housings 108, 110 to heat to approximately the same ambient temperature. Doing so may avoid grouping components that generate the most heat into the same housing, thereby causing one housing to be hotter than the other housing. The temperature sensors 160 may be used to determine a current ambient temperature (e.g., in Celsius or Fahrenheit) within each of the housings 108, 110, a current ambient temperature close to each of the display devices 102, 104, or both. The colors displayed by the display devices 102, 104 may change based on temperature.

The display devices 102, 104 may be configured to behave as independent display devices or the display device 104 may be configured as an extension of the display device 102 to enable both display devices to function as a single larger sized display device. The operating system of the computing device 100 may enable the user to "lock" a particular orientation (e.g., rotation) of the content being displayed on each display device to avoid the computing device 100 repeatedly re-orientating (e.g., rotating) the content as the user moves (e.g., re-positions) the computing device 100.

Software instructions implementing an operating system and one or more applications, including at least one application to reduce (or eliminate) perceived color differences between the display devices 102, 104, may be stored in the memory 116. The software instructions may be executed by the CPU 112, by the GPU 114, or any combination thereof.

A stylus 162 may include an end with a tip 164 that is used to simulate writing with ink on the touchscreen display devices 102, 104. The end opposite the tip 164 may be used to house one or more pen sensors 166. An end cap 168 may be used to cover and protect the pen sensors 166. The end cap 168 may include a magnet 170 that magnetically holds the end cap 168 in place on the stylus 162.

The stylus 162 may be communicatively paired, e.g., using a near field communication (NFC) technology such as Bluetooth®, to the computing device 100. When a user physically removes the end cap 168, one of the pen sensors 166, such as a hall effect sensor or other magnetic sensor), may determine that the end cap 168 has been removed and send a notification to the computing device 100 indicating that the end cap 168 has been removed. For example, when a user desires to calibrate the display devices 102, 104, (1) the computing device 100 may display a prompt 180 to a novice user to remove the end cap 168 from the stylus 162 or (2) an experienced user may (without prompting) remove the end cap 168. The stylus 168 may detect the removal of the end cap 168 from the end of the stylus 162 and send a notification message to the computing device 100 indicating that the end cap 168 has been removed. In response, the computing device 100 may automatically launch a calibration software application ("app") 172.

The calibration app 172 may display a pattern 182 on the first display device 102 and display the prompt 180 (e.g., on one or both of the display devices 102, 104) instructing the user to use the stylus 168 to trace the pattern 182 being displayed on the first display device 102. When the user uses the stylus 162 to trace the pattern 182, the pen sensors 166 may gather sensor data 174(1). After the stylus 162 determines that the tracing has been completed (e.g., the pen sensors 166 detect that the stylus 162 is no longer being moved), the stylus 162 may send the sensor data 174(1) to the computing device 100 over a network 176 (eg. In response, the calibration app 172 may stop displaying the pattern 182 on the first display device 102, initiate displaying the pattern 182 on the second display device 104, and display the prompt 180 (e.g., on one or both of the display devices 102, 104) instructing the user to use the stylus 162 to trace the pattern 182 being displayed on the second display device 104. When the user uses the stylus 162 to trace the pattern 182 displayed on the second display device 102, the pen sensors 166 may gather sensor data 174(2). After the stylus 162 determines that the tracing has been completed (e.g., the pen sensors 166 detect that the stylus 162 is no longer being moved), the stylus 162 may send the sensor data 174(2) to the computing device 100. In response, the calibration app 172 may stop displaying the pattern 182 (and the prompt 180) on the second display device 104. The calibration app 172 may perform a comparison of the sensor data 174(1) (associated with the first display device 102) with the sensor data 174(2) (associated with the second display device 104) and determine (based on the comparison) calibration data 178. The calibration data 178 may reduce a perceived difference in color and/or brightness between the first display device 102 and the second display device 104. The calibration data 178 may be stored in the memory 116 and applied to one or both of the first display device 102 and the second display device 104 to reduce perceived differences and thereby improve the user's experience.

The user may be prompted to hold the stylus 162 with the pen sensors 166 facing towards one of the display devices 102, 104 when the pattern 182 is used to calibrate color settings (e.g., gamma, chroma, luma, and the like) associated with each of the display devices 102, 104. For example, the calibration data 178 may include color settings for each of the display devices 102, 104. The user may be prompted to hold the stylus 162 with the pen sensors 166 facing away from the display devices 102, 104 when the pattern 182 to calibrate a brightness and contrast of each of the display devices 102, 104. For example, the pen sensors 166 may include an ambient light sensor (ALS). When the sensors 166 face upward, the sensors 166 may determine an amount of ambient light striking different portions of each of the display devices 102, 104. The calibration app 172 may determine the calibration data 178 that includes brightness and contrast adjustments to one or both of the computing devices 102, 104 to compensate for different amounts and different types (e.g., sunlight, incandescent, florescent, and the like) of light striking different portions of the computing devices 102, 104 and thereby reduce perceived differences.

Based on sensor data received from the pen sensors 166 of the stylus 162 during a calibration process, the computing device 100 may adjust color parameters of one or both of the display devices 102, 104 to reduce (or eliminate) perceived color differences between the display devices 102, 104. The color parameters that are adjusted for each of the display devices 102, 104 may include at least one of chroma (e.g., hue and saturation), gamma, or luma (e.g., relative luminance), and whitepoint. In some cases, one or more of the chroma values, gamma values, and luma values may be pre-calculated and used to create lookup tables for chroma, gamma, and luma. See Tables 1 and 2 below as examples of a gamma table. Similar lookup tables may be created for chroma and luma. Because the complex calculations were previously performed to create the values in the lookup table, retrieving values from a lookup table does not require significant a significant amount of processing power and may be performed by a CPU that is not capable of performing floating point computations and the like. Thus, the CPU 112 may not have a relatively fast clock speed and may be energy efficient.

Reducing color differences between the display devices 102, 104 may maintain readability of content, including video, text, and graphics. For example, the display device 102 may appear washed out (e.g., due to direct light) and may be brightened, but it may not be desirable to have the display device 102 too bright. For example, making the display device 102 too bright may increase power consumption significantly, increase heat generation by the circuitry of the display device 102 significantly, cause the display device 102 to appear harsh, shorten the lifespan of the display device 102, or any combination thereof. In such situations, the brightness of the display device 102 may be increased and the brightness of the display device 104 may be decreased to reduce the differences between the display devices 102, 104.

Chroma (also known as chrominance) conveys the color information in images, separately from the accompanying luma (brightness) of the images. Chrominance may be represented as two color-difference components: U=B'−Y' (blue−luma) and V=R'−Y' (red−luma). Scale factors and offsets may be applied to each difference component, as specified by an applicable video standard. In video signals, the U and V signals may modulate a color subcarrier signal, resulting in a chrominance signal. The phase and amplitude of the modulated chrominance signal may correspond approximately to the hue and saturation of the color. In terms of digital video and digital images, the luma and chroma components may be digital values.

Luma is the weighted sum of gamma-compressed R'G'B' components of video data. The prime symbol ' denotes gamma compression. Relative luminance may be expressed as weighted sum of linear RGB components. Luma (e.g., relative luminance) may refer to the brightness of a display device. The formula used to calculate relative luminance may uses coefficient based on the CIE color matching functions and the relevant standard chromaticities of red, green, and blue. CIE 1931 is a Color Matching System that specifies how to numerically specify a measured color, and accurately reproduce that measured color (e.g. in print or on a digital display device). The Color Matching System indicates which combinations of light appear to a user to be the same color ("match"). Luma (e.g., gamma-corrected luminance) describes the exposure (brightness) of an image or a series of images (e.g., video). Luma may be separated from the color of an image or a series of images (e.g., video). Luma may be measured per color as a digital percentage from 0 to 100, where 0 represents absolute black and 100 represents absolute white.

Gamma refers to the nonlinear representation of luminance in an image or series of images displayed on a display device. Gamma is also used to describe a nonlinear adjustment made to the distribution of midtones in an image. For example, a gamma adjustment may not alter the black point and the white point of an image, but may brighten or darken the mid-tones, based on the type of adjustment being made. Chroma (also referred to as chrominance) describes the color channels in images, ranging from the absence of color to the maximum levels of color that can be represented. Specific chroma values can be described using two properties, hue and saturation.

A white point is a set of chromaticity coordinates that define the color "white" as displayed by a display device. Depending on the application, different definitions of white may be used. For example, photographs taken indoors may be lit by incandescent lights, which are relatively orange compared to daylight. Defining "white" as daylight may cause unacceptable results when attempting to color-correct an image with incandescent lighting that displayed on a display device.

In some cases, a user may perceive a difference in colors between the display devices 102, 104 based in part on light sources that each have different color temperatures. Color temperature describes the appearance of light from a light source and is measured in degrees of Kelvin (K) on a scale from 1,000 to 10,000. For example, commercial and residential lighting may have a color temperature between 2000K to 6500K. Color temperatures between 2000K to 3000K may be referred to as "warm white" and may range from orange to yellow-white in appearance. Color temperatures between 3100K and 4500K may be referred to as "cool white" or "bright white" and may emit a relatively neutral white light or white light with a slightly blue tint. Color temperatures above 4500K may be referred to as "daylight" color temperatures because the light is similar to daylight. For example, if a user is sitting in a building near a window, one of the light sources may be cool white (e.g., the building's interior lighting) while another of the light sources may be daylight filtered through a window of the building.

The user may perceive a difference in colors between the two display devices 102, 104 due to the amount of direct and indirect light and the color temperatures of the light sources. For example, the colors displayed by the display device 102 may appear to the user to be different than colors displayed by the display device 104 due to the different light sources. The pen sensors 166 may gather the sensor data 174 from the pen sensors 166 during a calibration process. Based on the sensor data 174, the computing device 100 may modify one or more of the gamma, chroma, and luma levels for one or both of the display devices 102, 104 to reduce (or eliminate) the difference in the perceived colors (and color brightness) between the display devices 102, 104.

Figure 2:
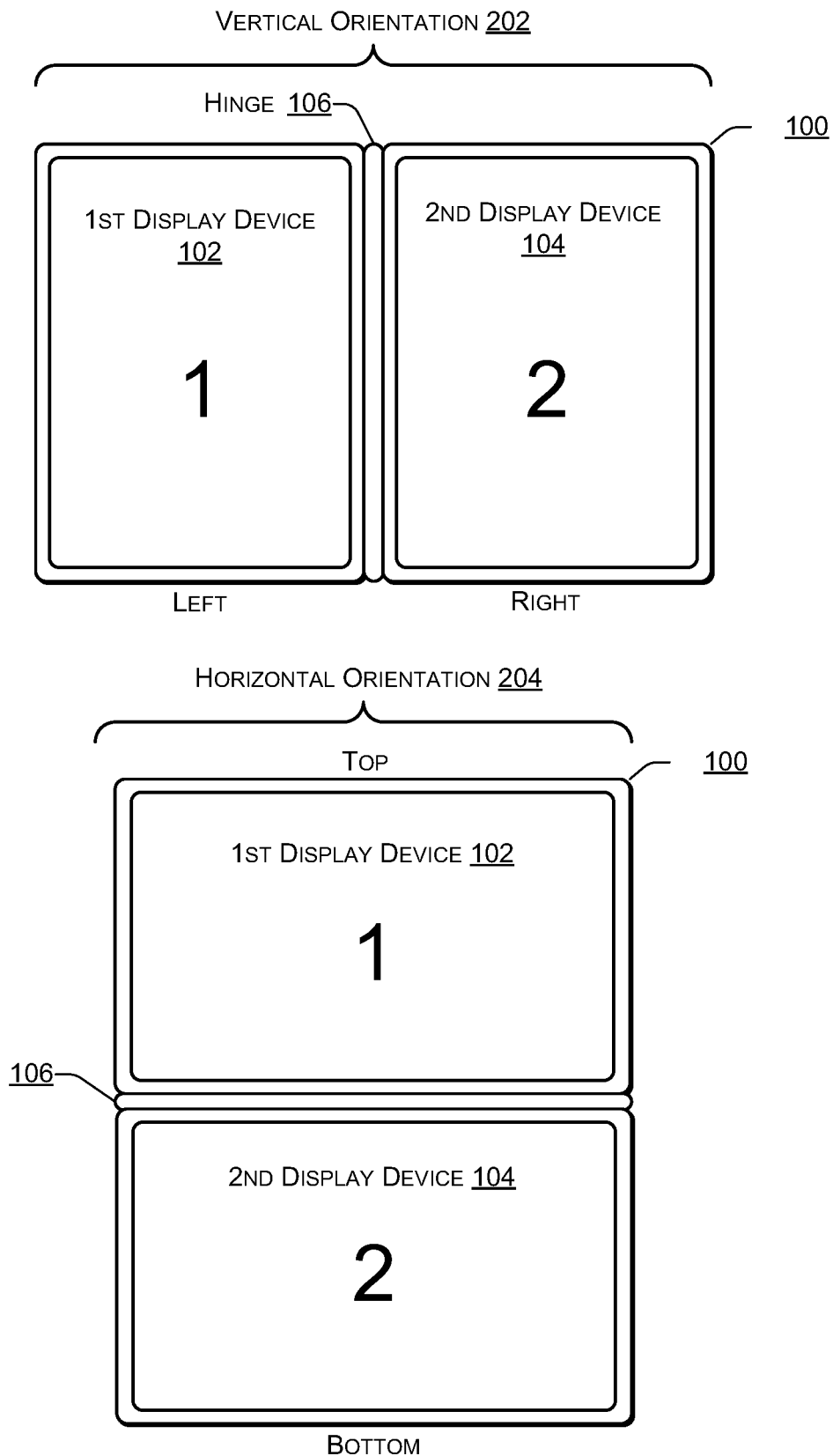
FIG. 2 is a block diagram illustrating different orientations of a dual-display device according to some embodiments.
Figure 3:
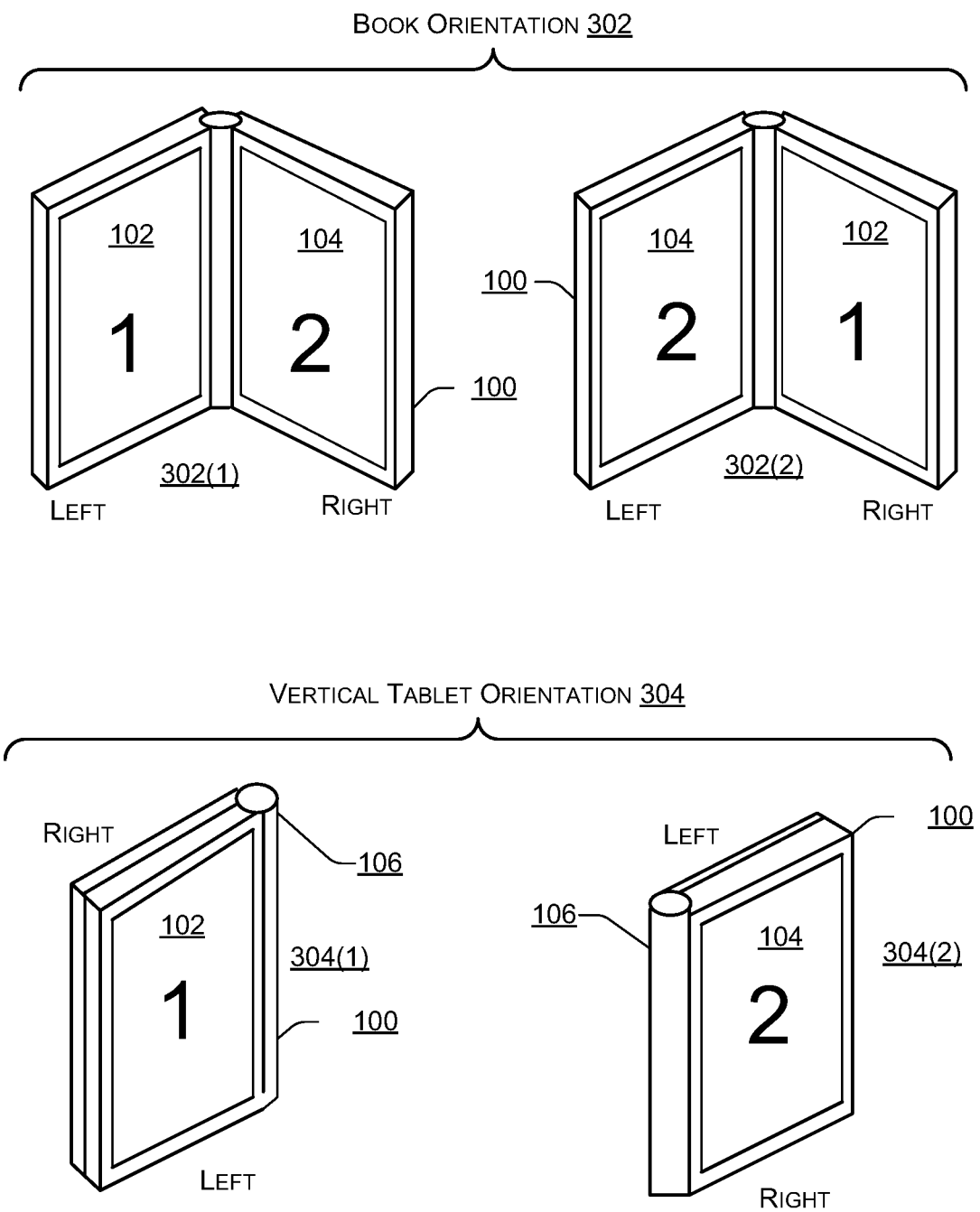
FIG. 3 is a block diagram illustrating modes of a dual-display device in a vertical orientation according to some embodiments.

FIG. 2 is a block diagram 200 illustrating different orientations of a dual-display device (e.g., the computing device 100 of FIG. 1) according to some embodiments. The computing device 100 may include at least two display devices 102, 104. The computing device 100 may be displayed in a vertical (e.g., portrait) orientation 202 or a horizontal (e.g., landscape) orientation 204. For example, in the vertical orientation 202, the first display device 102 may be on one side (e.g., the left side or the right side), the second display device 104 may be on another side (e.g., the right side or the left side), and the hinge 106 may join the first display device 102 to the second display device 104. Additional examples of the vertical orientation 202 are illustrated in FIG. 3. In the horizontal orientation 204, the first display device 102 may be located at the top (or the bottom) of the computing device 100 with the hinge 106 in the middle and the second display device 104 may be located at the bottom (or the top) of the computing device 100. Additional examples of the horizontal orientation 204 are illustrated in FIG. 4.

FIG. 3 is a block diagram 300 illustrating additional vertical orientations of a dual-display device according to some embodiments. Additional examples of the vertical orientation 202 may include a book orientation 302 and a vertical tablet orientation 304. For example, in a first book orientation 302(1), the first display device 102 may be on the left and the second display device 104 may be on the right. Alternately, in a second book orientation 302(2), the second display device 104 may be on the left and the first display device 102 may be on the right.

In the vertical tablet orientation 304, the first display device 102 may be on the left and the second display device 104 may be on the right. In a first vertical tablet orientation 304(1), the first display device 102 may be facing a user and the second display device 104 may be rotated approximately 360 degrees to face away from the user. In a second vertical tablet orientation 304(2), the second display device 104 may be facing the user while the first display device 102 may rotated approximately 360 degrees to face away from the user.

Figure 4:
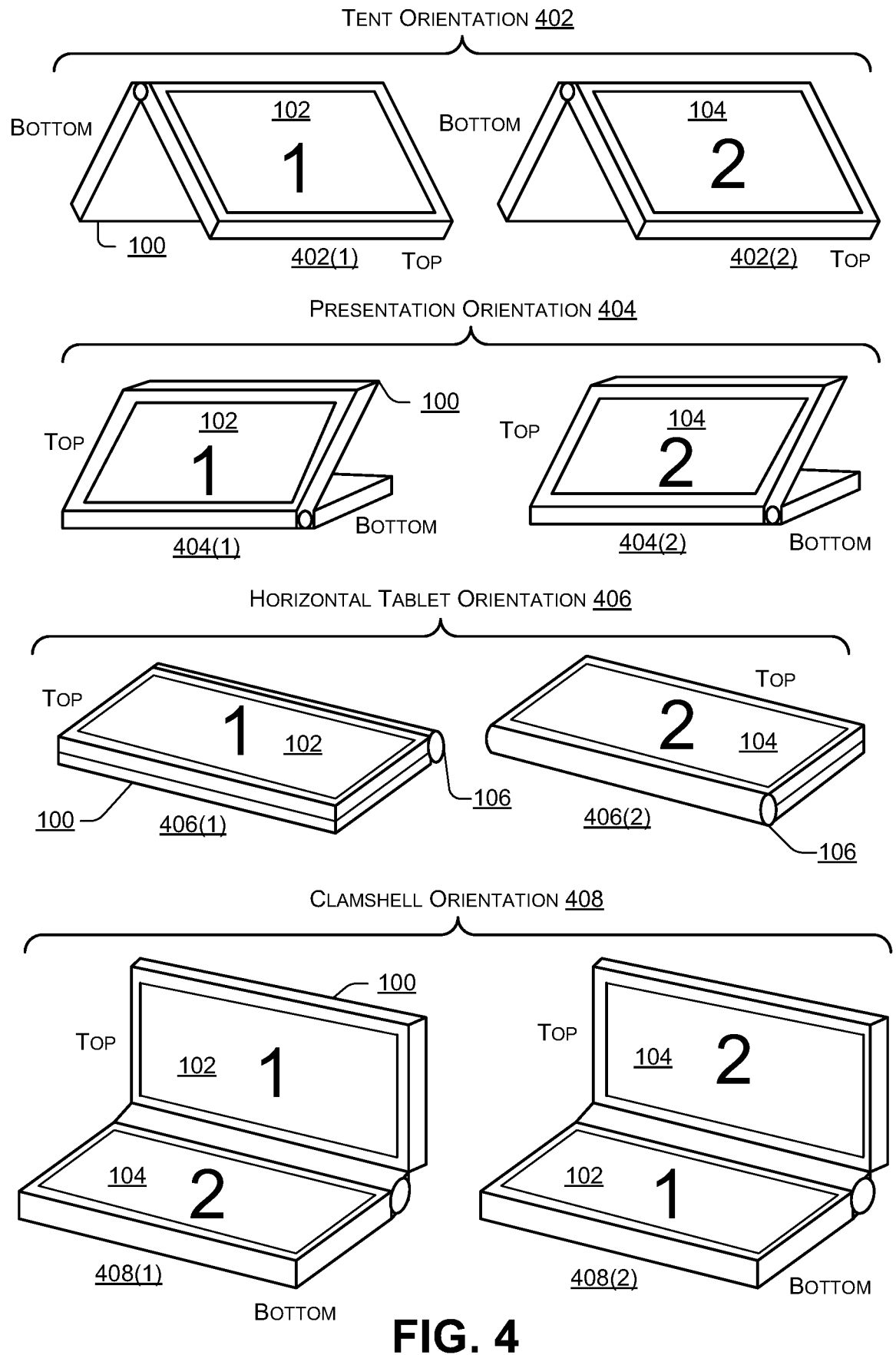
FIG. 4 is a block diagram illustrating modes of a dual-display device in a horizontal orientation according to some embodiments.

FIG. 4 is a block diagram 400 illustrating additional horizontal orientations of a dual-display device according to some embodiments. Additional examples of the horizontal orientation 204 may include a tent orientation 402, a presentation orientation 404, a horizontal tablet orientation 406, and a clamshell orientation 408.

In 402(1), the first display device 102 may be at the top facing the user while the second display device 104 may be at the bottom facing away from the user. In 402(2), the second display device 104 may be at the top facing the user and the first display device 102 may be at the bottom facing away from the user.

In 404(1), the first display device 102 may be at the top facing the user and the second display device 104 may be at the bottom facing down. In 404(2) the second display device 104 may be at the top facing the user and the first display device 102 may be at the bottom facing down.

In 406(1), the first display device 102 may be at the top facing the user and the second display device 104 may be at the bottom facing down (e.g., away from the user). In 406(2), the second display device 104 may be at the top facing the user and the first display device 102 may be at the bottom facing down (e.g., away from the user).

In 408(1), the first display device 102 may be at the top facing the user and the second display device 104 may be at the bottom facing the user (e.g., in a position where traditionally, a keyboard is located in a laptop). In 408(1), in some cases, a QWERTY-based keyboard may be displayed on the second display device 104 and used to receive keyboard input. In 408(2), the second display device 104 may be at the top facing the user and the first display device 102 may be at the bottom facing the user (e.g., in a position where traditionally, a keyboard is located in a laptop). In 408(2), in some cases, a QWERTY-based keyboard may be displayed on the first display device 102 and used to receive keyboard input.

Figure 5:
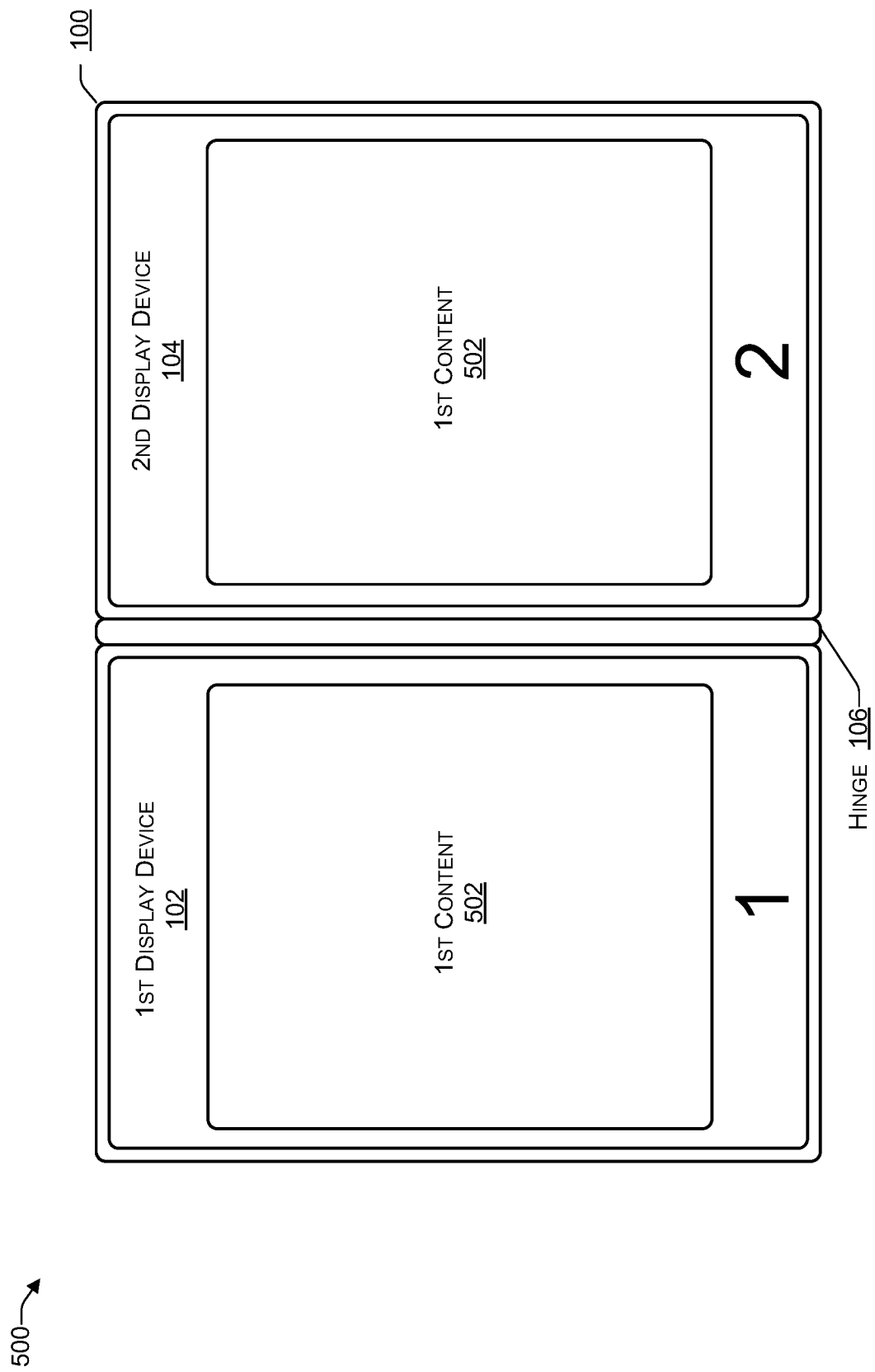
FIG. 5 is a block diagram illustrating a dual-display device in which the operating system is in a clone mode according to some embodiments.

FIG. 5 is a block diagram 500 illustrating a dual-display device in which the operating system is in a clone mode according to some embodiments. An operating system of the computing device 102, such as Microsoft® Windows®, may provide three display modes: (a) an extended desktop mode in which the display devices 110, 112 behave as if they were a single display device, with the display device 112 behaving as an extension of the display device 110 (b) a clone mode in which each of the display devices 110, 112 display the same content, or (c) a single display mode, e.g., one of the display devices 110, 112 displays content while the other display device is off (or blank) and does not display content. For example, single display mode may be used when the computing device is in a tablet orientation to turn off a particular display device (of the display devices 102, 104) that is not facing the user or is not visible to the user.

In the clone mode, first content 502 may be displayed on the first display device 102. The first content 502 may also be displayed on the second display device 104. Thus, in the clone mode, the same content 502 may be displayed on both display devices 102, 104.

Figure 6:
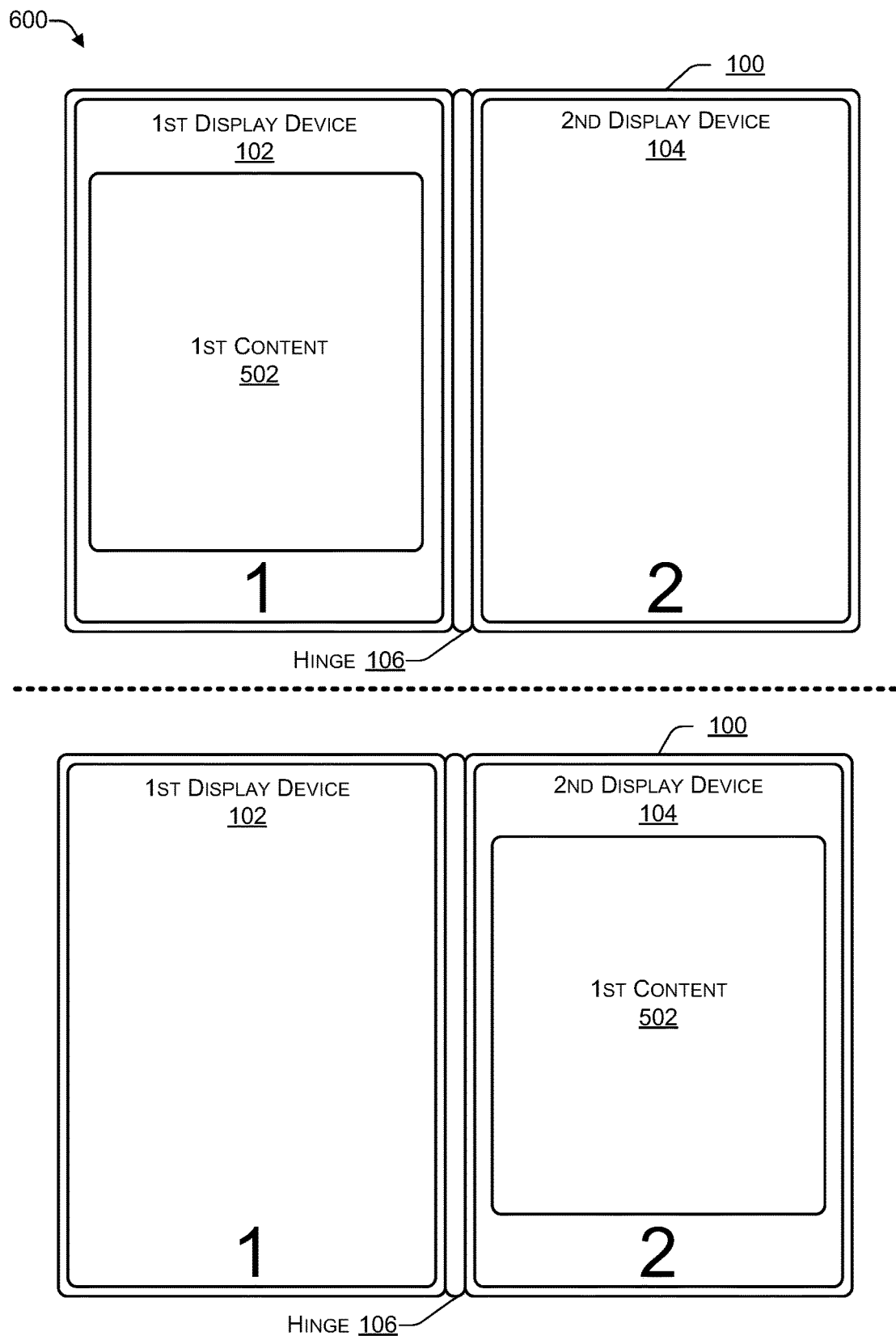
FIG. 6 is a block diagram illustrating a dual-display device in which the operating system is in a single display mode according to some embodiments.

FIG. 6 is a block diagram 600 illustrating a dual-display device in which the operating system is in a single display mode according to some embodiments. When an operating system of the computing device 102 of FIG. 1 is in the single display mode, the first content 502 may be displayed on either (but not both) of the first display device 102 or the second display device 104. For example, the first content 502 may be displayed on the first display device 102 and the second display device 104 may not display any content (e.g., the second display device 104 may be blank or off), as illustrated in the top of FIG. 6. As another example, the first content 502 may be displayed on the second display device 104 and the first display device 102 may not display any content (e.g., the first display device 102 may be blank or off), as illustrated in the bottom of FIG. 6.

The single display mode may be used when the computing device 100 is in one of the orientations 304 of FIG. 3 or 406, 402 of FIG. 4. In these orientations, the single display mode may reduce power consumption by turning off (or not displaying content on) whichever of the display devices 102, 104 is not facing the user. In addition, using the single display mode may prevent others in the surrounding area from viewing the content being displayed, thereby providing privacy and security when confidential information is being displayed.

Figure 7:
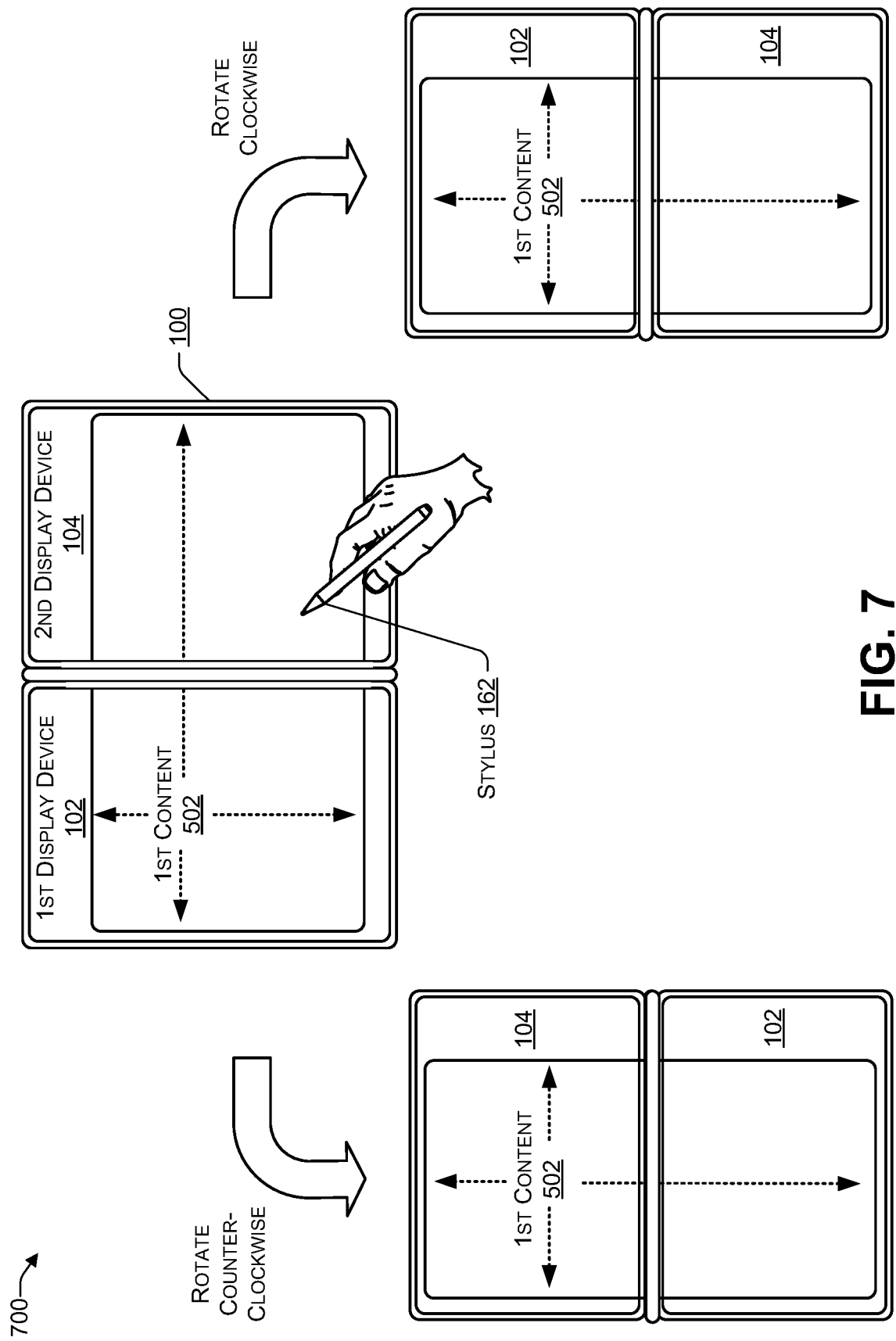
FIG. 7 is a block diagram illustrating a dual-display device in which the operating system is in an extended display mode displaying content that spans both display devices according to some embodiments.

FIG. 7 is a block diagram 700 illustrating a dual-display device in which the operating system is in an extended display mode with content spanning both display devices according to some embodiments. When the operating system of the computing device 102 of FIG. 1 is in the extended display mode, some content, such as the first content 502, may be displayed to span both the first display device 102 and the second display device 104. In some cases, additional content may be displayed on either or both of the first display device 102 or the second display device 104. The user may provide touch-input using a finger (or other appendage) or a touch-input device, such as a stylus 702.

When the user rotates the computing device 100 counter-clockwise, the computing device 100 may automatically re-position the first content 502, as illustrated in FIG. 7, by rotating the content 502 clockwise 90 degrees. When the user rotates the computing device 100 clockwise, the computing device 100 may automatically re-position the first content 502, as illustrated in FIG. 7, by rotating the content 502 clockwise 270 degrees. In this way, when the user re-positions (e.g., re-orients) the computing device 100, the content 502 may be rotated to display the first content 502 in a correct orientation relative to the user.

Figure 8:
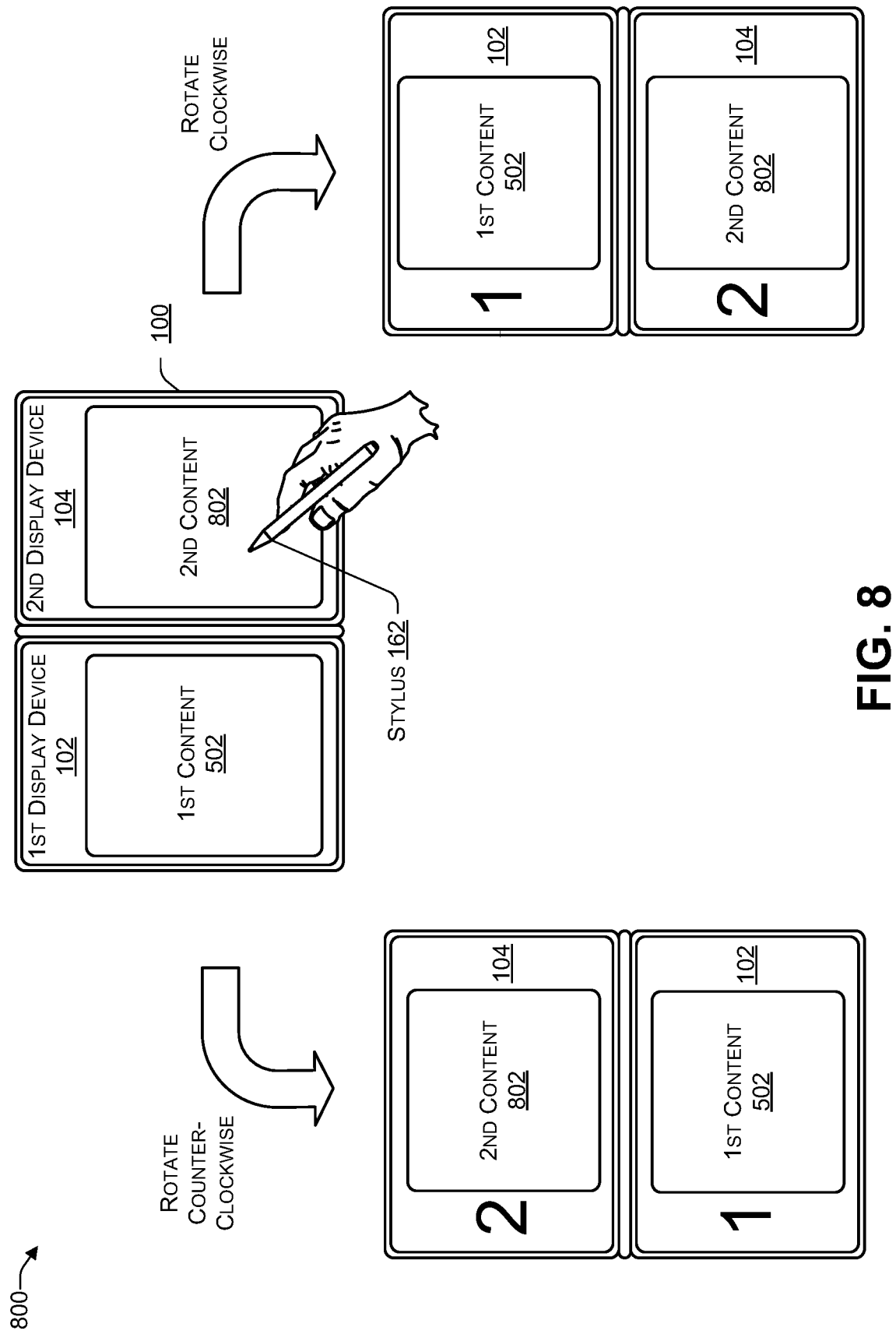
FIG. 8 is a block diagram illustrating a dual-display device in which the operating system is in an extended display mode displaying first content and second content according to some embodiments.

FIG. 8 is a block diagram 800 illustrating a dual-display device in which the operating system is in an extended display mode with first content and second content according to some embodiments. When the operating system of the computing device 102 of FIG. 1 is in the extended display mode, the first content 502 may be displayed on the first display device 102 and second content 802 may displayed on the second display device 104. In some cases, additional content may be displayed on either or both of the first display device 102 or the second display device 104. The user may provide touch-input using a finger (or other appendage) or a touch-input device, such as a stylus 702.

When the user rotates the computing device 100 counter-clockwise, the computing device 100 may automatically re-position the first content 502 and second content 802, as illustrated in FIG. 8, by rotating each of the content 502, 802 clockwise 90 degrees. When the user rotates the computing device 100 clockwise, the computing device 100 may automatically re-position the content 502, 802, as illustrated in FIG. 8, by rotating the content 502, 802 clockwise 270 degrees. In this way, when the user re-positions (e.g., re-orients) the computing device 100, the content 502, 802 may be rotated to a correct (e.g., viewable) orientation relative to the user.

Figure 9:
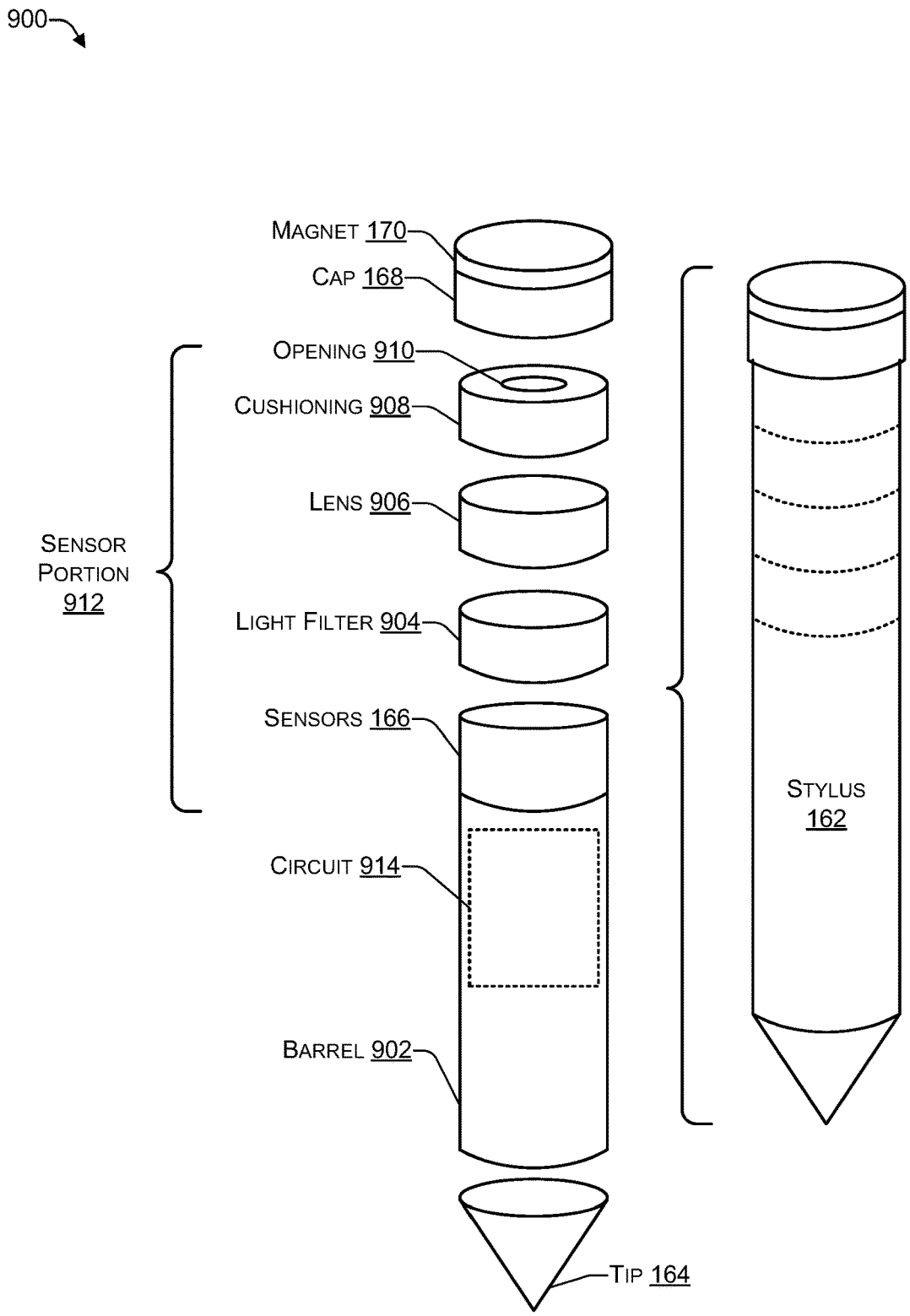
FIG. 9 is a block diagram illustrating components of a stylus according to some embodiments.

FIG. 9 is a block diagram 900 illustrating components of a stylus (e.g., the stylus 162 of FIG. 1) according to some embodiments. The stylus 162 may include multiple components, such as, for example, a barrel 902, the sensors 166 (e.g. one or more sensors, including at least one or more light sensors, a gyroscope sensor, and a Hall effect or other magnet-sensitive sensor), a light filter layer 904, a lens layer 906, a cushioning layer 908, and the removeable cap 168 with the magnet 170. Collectively, the sensors 166, the light filter 904, the lens 906, and the cushioning 908 may be referred to as a sensor portion 912 of the stylus 162. The sensor portion 912 may be located inside the barrel 902. In FIG. 9, the components 166, 904, 906, and 908 of the sensor portion 912 are illustrated outside the barrel 902 purely for ease of illustration.

When the end cap 168 is removed, the cushioning layer 908 may be placed on or near an exterior surface of the display devices 102, 104 of FIG. 1, e.g., during a color calibration process. The cushioning layer 908 may be made from a material, such as a rubber compound, that can come into contact the exterior surface of the display devices 102, 104 without permanently damaging (e.g., without scratching) the exterior surface of the display devices 102, 104. An opening 910 in approximately a center of the cushioning layer 908 may enable light (e.g., light from the display devices 102, 104 or ambient light) to travel to through the layers 904, 906 to the light sensors in the sensors 166. Thus, the cushioning 908 may have a toroidal shape.

The lens layer 906 may be made from plastic, glass, or another transparent or translucent material that enables light to pass through. The lens layer 906 may magnify (e.g., increase an intensity of) the light entering through the opening 910 to enable the sensors 166 to gather data associated with the light. The lens layer 906 may diffuse (e.g., spread out) the light entering through the opening 910 to enable the light to cover a larger surface area of light sensors in the sensors 166.

The light filter 904 may be made from plastic, glass, or another transparent or translucent material that enables light to pass through. The light filter 904 may selectively filter specific frequencies of the light entering through the opening 910 to enable the sensors 166 to gather data associated with the light. For example, the light filter 904 may filter out frequencies that are not visible to the human eye while letting frequencies that are visible to the human eye to pass through. To illustrate, the light filter 904 may allow to pass through to the sensors 166 frequencies that are between about 430 to 770 tera Hertz (THz) (e.g., wavelengths from about 390 to 700 nanometers), e.g., frequencies that are visible to the human eye. The light filter 904 may filter out frequencies that are not humanly perceivable, e.g., below about 430 THz and above about 770 THz.

Thus, light that enters into the opening 910, may be amplified and diffused by the lens layer 906, and filtered by the light filter 904, before reaching one or more light sensors in the sensors 166. In addition to one or more light sensors, the sensors 166 may include a Hall effect (or similar) sensor to determine whether the end cap 168 has been placed on the end of the stylus 166 or whether the end cap 168 has been removed from the end of the stylus 168. For example, if the Hall effect sensor determines that the magnet 170 is present, the sensors 166 may determine that the end cap 168 has been placed on the end of the stylus 166. If the Hall effect sensor determines that the magnet 170 is absent, the sensors 166 may determine that the end cap 168 has been removed from the end of the stylus 166. The barrel 902 may house a circuit 914, as described further in FIG. 10.

Figure 10:
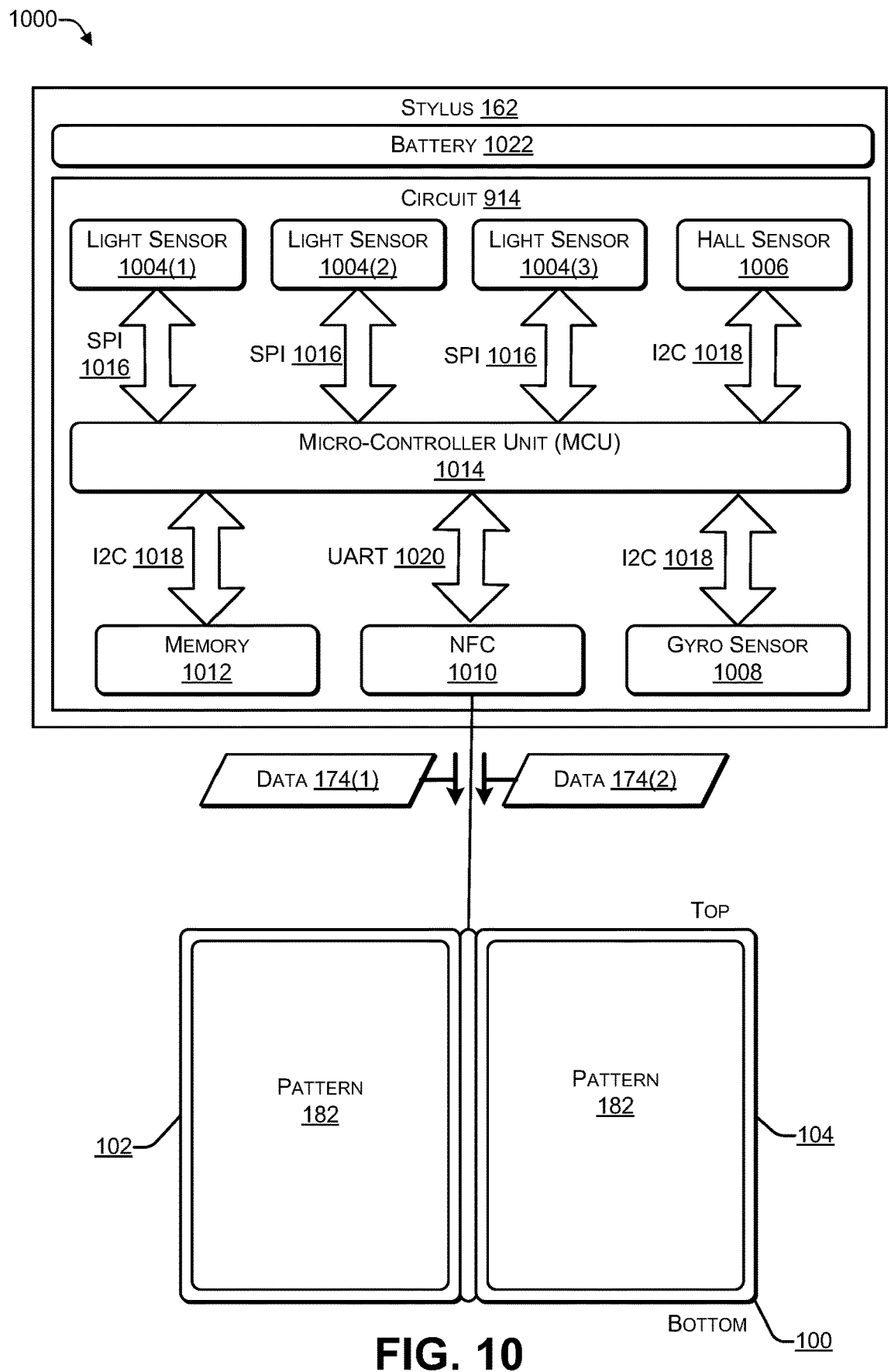
FIG. 10 is a block diagram illustrating a circuit of a stylus according to some embodiments.

FIG. 10 is a block diagram 1000 illustrating a circuit of a stylus according to some embodiments. The stylus 162 may include the circuit 914. The circuit 914 may include multiple sensors, such as, for example, light sensors 1004(1), 1004(2), and 1004(3) (e.g., for detecting red, green, and blue, respectively), a Hall-effect sensor 1006 (or another type of sensor capable of detecting the presence of a magnetic field), and a gyro (e.g., gyroscope) sensor 1008 (e.g., to determine an orientation of the stylus 162). The circuit 914 may include a hardware component to provide near field communications (NFC) 1010 with the computing device 100. For example, the NFC 1010 may use Bluetooth®, ZigBee®, wireless universal serial bus (WUSB), or another type of near field wireless communication technology to transmit the data 174 to the computing device 100. The circuit 914 may include one or more types of memory 1012, including random access memory (RAM), read-only memory (ROM), and the like. For example, in some cases, the memory 1012 may include electrically erasable programmable ROM (EEPROM).

The sensors 166 of FIG. 1 may include the sensors 1004(1), 1004(2), 1004(3), 1006, and 1008. The light sensors 1004 may be connected to a micro-controller unit (MCU) 1014 (or another type of embedded controller) using a first type of bus, such as a serial peripheral interface (SPI) 1016. The Hall effect sensor 1006 and the gyro sensor 1008 may be connected to the MCU 1014 using a second type of bus, such as an Inter-Integrated Circuit (I2C) 1018. The NFC 1010 may be connected to the MCU 1014 using a third type of bus, such as a Universal Asynchronous Receiver/Transmitter (ART) 1020.

The stylus 162 may include at least one battery 1022 to provide power to the various components of the stylus 162, such as the circuit 914. In some cases, the MCU 1014 may be a Microchip PIC18F14K50 or similar, the memory 1012 may be a Microchip 24LC64 EEPROM or similar, the NFC 1010 may be a Bluetooth transceiver from Nordic Semiconductor or similar, the gyro sensor 1008 may be a ST Microelectronics LSM6DS3USTR or similar, the light sensors 1004 may be an AMS TMG49033 or similar, and the Hall effect sensor 1006 may be a Rohm BU52012HFV or similar.

Figure 11:
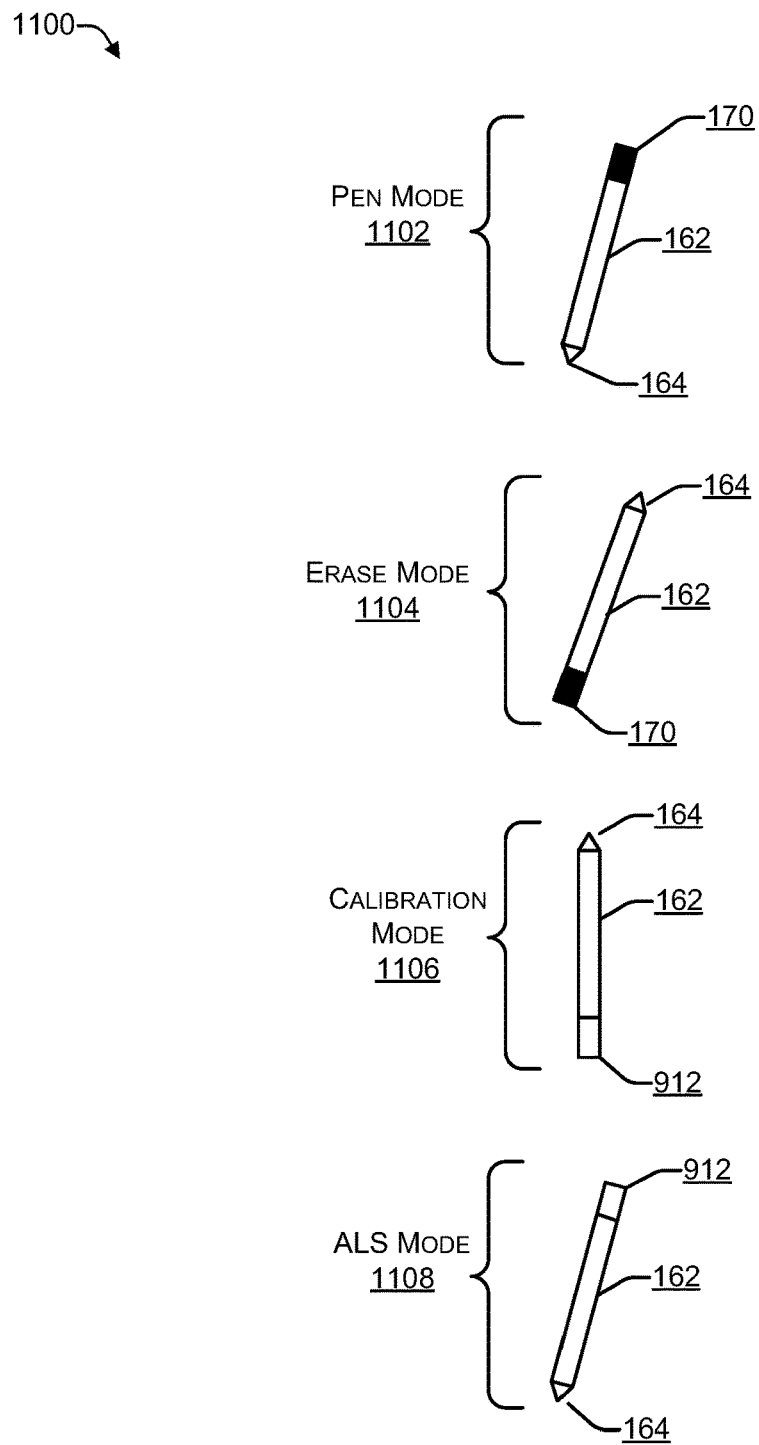
FIG. 11 is a block diagram illustrating different modes of a stylus according to some embodiments.

FIG. 11 is a block diagram illustrating different modes of a stylus according to some embodiments. A pen mode 1102 may be used to provide input to the computing device 100 of FIG. 1 by engaging the tip 164 with a touchscreen surface of the display devices 102, 104 in a manner similar to using a pen or pencil on paper. In the pen mode 1102, the cap 170 is on the stylus 162 and the tip 164 is pointing down.

An erase mode 1104 may be used to remove previously provided input by pointing the cap 170 towards the touchscreen surface of the display devices 102, 104 in a manner similar to using a pencil eraser on paper. In the erase mode 1104, the cap 170 is on the stylus 162, with the cap 170 pointing down and the tip 164 pointing up.

A calibration mode 1106 may be used to calibrate the display devices 102, 104 to reduce perceived color differences between the display devices 102, 104. In the calibration mode 1106, the user may remove the cap 170 from the stylus 162, exposing the sensor portion 912 of the stylus 162 to colors output by the display devices 102, 104. The user may move the sensor portion 912 over a pattern displayed on each of the display devices 102, 104 to enable the sensors 166 to gather color data associated with each of the display devices 102, 104. In the calibration mode 1106, the cap 170 has been removed from the stylus 162, and the sensor portion 912 of the stylus 162 is pointing down while the tip 164 pointing up.

An ambient light sensor (ALS) mode 1108 may be used to calibrate a brightness and/or contrast of the display devices 102, 104 to reduce perceived differences due to the amount and type of ambient light falling on each of the display devices 102, 104. In the ALS mode 1108, the user may remove the cap 170 from the stylus 162, exposing the sensors 166 in the sensor portion 912 of the stylus 162 to measure ambient light at different locations in each of the display devices 102, 104. The user may move the tip 164 over a pattern displayed on each of the display devices 102, 104 to enable the upward pointing sensors 166 in the sensor portion 912 to measure ambient light data falling on different portions of each of the display devices 102, 104. In the ALS mode 1108, the cap 170 has been removed from the stylus 162, and the sensor portion 912 is pointing up (e.g., to enable the sensors 166 to measure ambient light data falling on different portions of each of the display devices 102, 104) while the tip 164 is pointing down.

Figure 12:
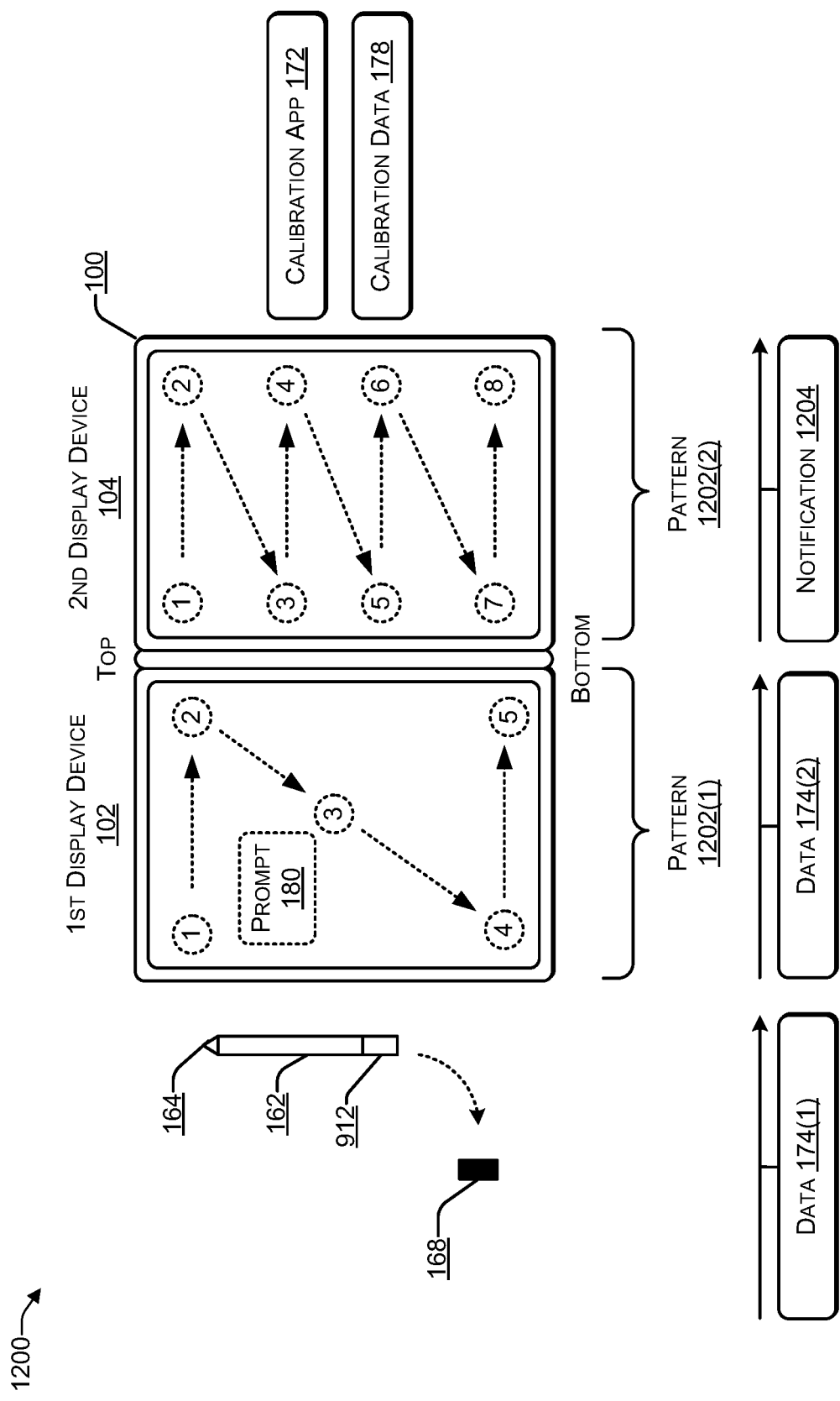
FIG. 12 is a block diagram illustrating displaying a pattern on a display device according to some embodiments.

FIG. 12 is a block diagram 1200 illustrating displaying a pattern on a display device according to some embodiments. When the end cap 168 is removed from an end of the stylus 162, the stylus may send a notification 1204 to the computing devices 100 indicating that the end cap 168 has been removed. In response, computing device 100 may automatically (e.g., without human interaction) launch the calibration app 172. Launching the calibration app 172 may initiate a calibration process. The calibration process may be either a color calibration process (e.g., to adjust one or more of gamma, chroma, or luma of each of the display devices 102, 104) or an ambient light calibration process (e.g., to compensate for differences in ambient light between the display devices). As part of the calibration process, the calibration app 172, may display a pattern, such as pattern 1202(1), on the display device 102 and instruct the user to trace the pattern 1202(1) using the stylus 162. After the sensors 166 in the sensor portion 912 have gathered the data 174(1) associated with the display device 102, the calibration app 172, may display a pattern, such as the pattern 1202(1) or another pattern 1202(2), on the display device 104 and instruct the user to trace the pattern 1202(2) using the stylus 162. For a color calibration process, the stylus 162 is placed in the calibration mode 1106 of FIG. 11. For an ambient light calibration process, the stylus 162 is placed in the ALS mode 1108 of FIG. 11.

After the sensors 166 in the sensor portion 912 have gathered the data 174(2) associated with the display device 104, the calibration app 172 may analyze the data 174(1) and 174(2) and create the calibration data 178 to reduce perceived color differences or perceived differences due to ambient light. The calibration data 178 may be stored in a memory of the computing device 100 and used to reduce perceived differences between the display devices 102, 104.

The patterns 1202(1) and 1202(2) are merely examples of the pattern 182 of FIG. 1. Typically, a single one of the patterns 1202 may be displayed when calibrating the display devices 102, 104. Of course, other patterns may be displayed. For example, any pattern that includes all four corners and the center of each of the display devices 102, 104 may be used.

Figure 13:
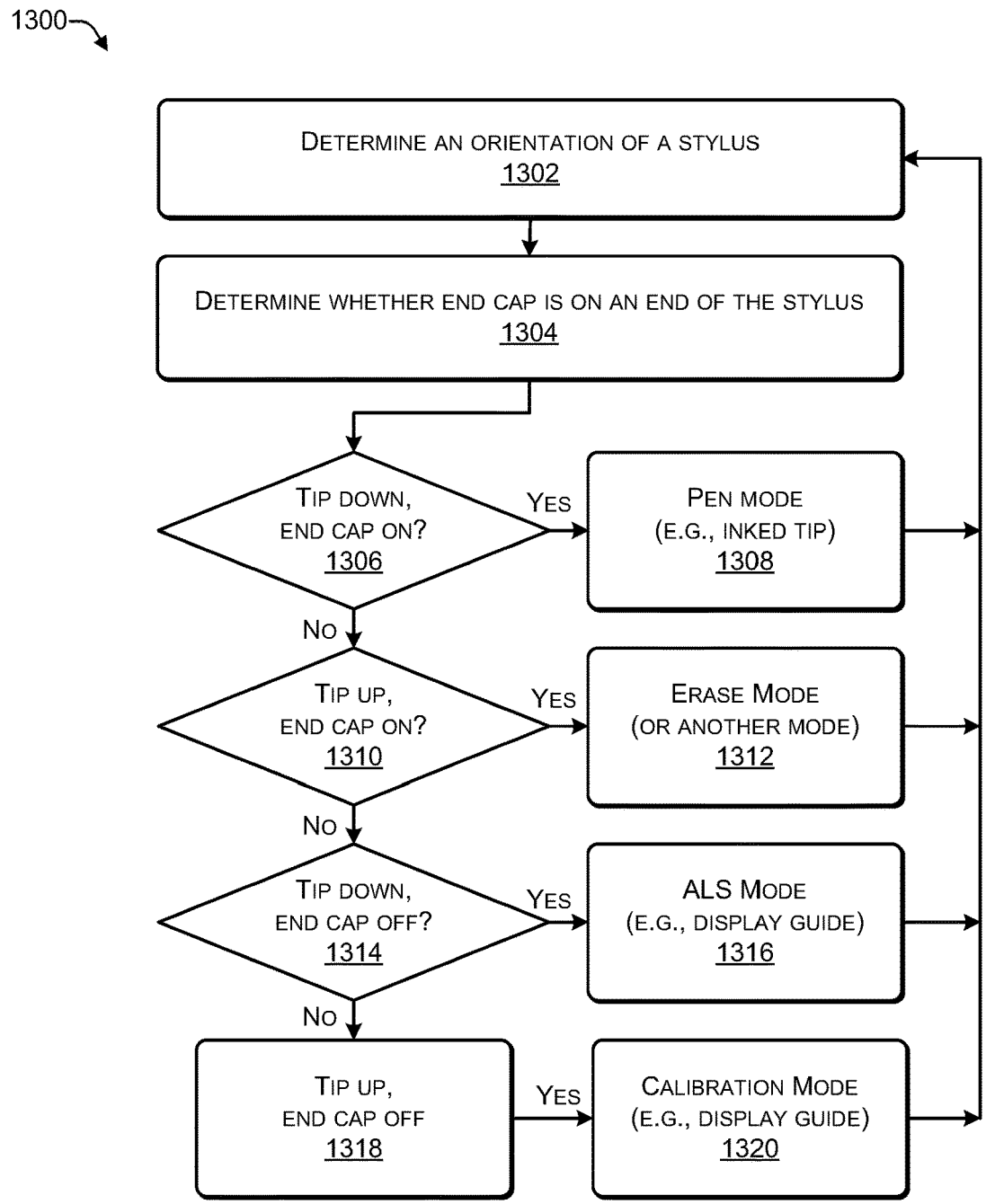
FIG. 13 is a flow chart of a process that includes determining an orientation of a stylus according to some embodiments.
Figure 14:
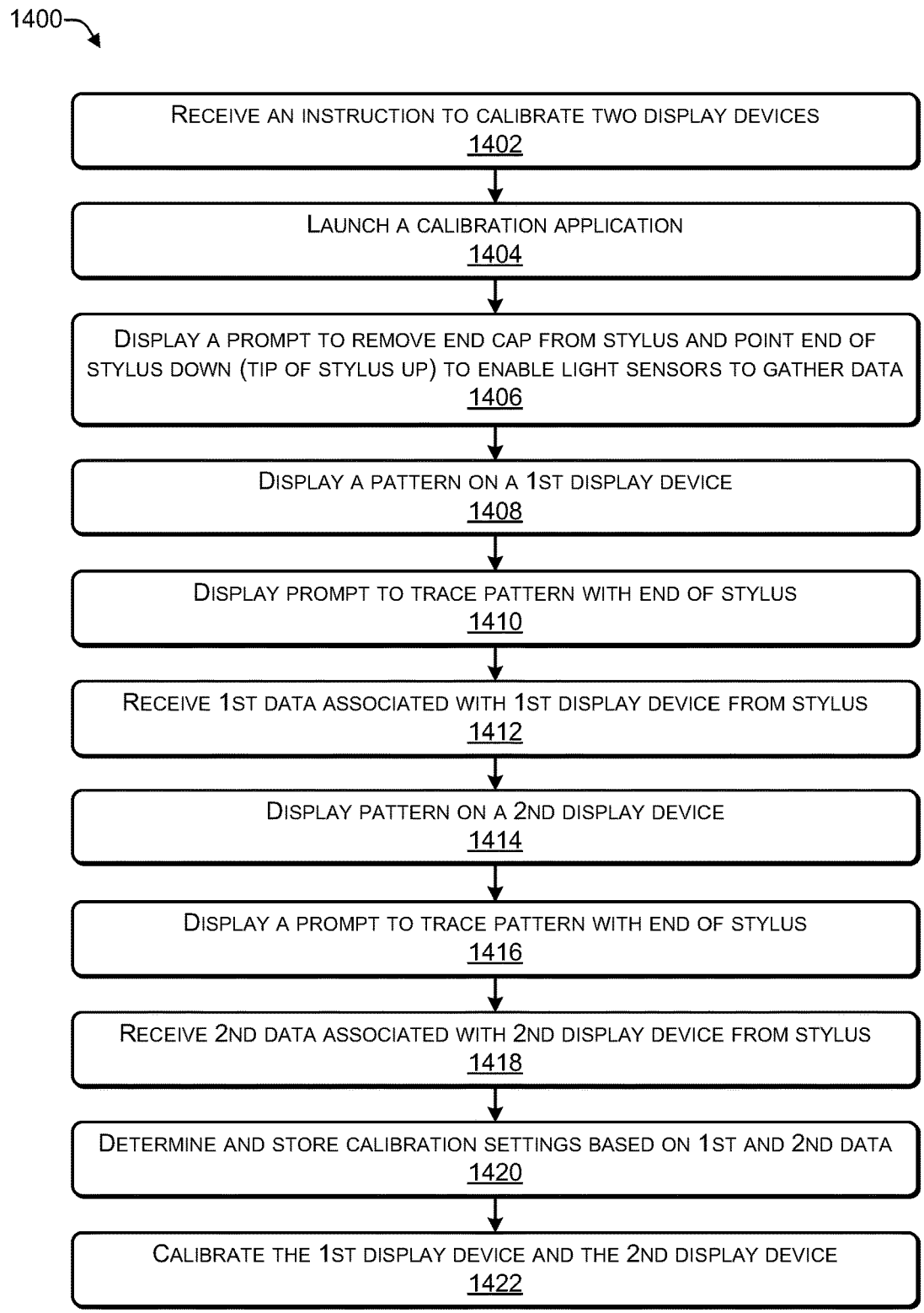
FIG. 14 is a flow chart of a process that includes displaying a pattern on a display device according to some embodiments.
Figure 15:
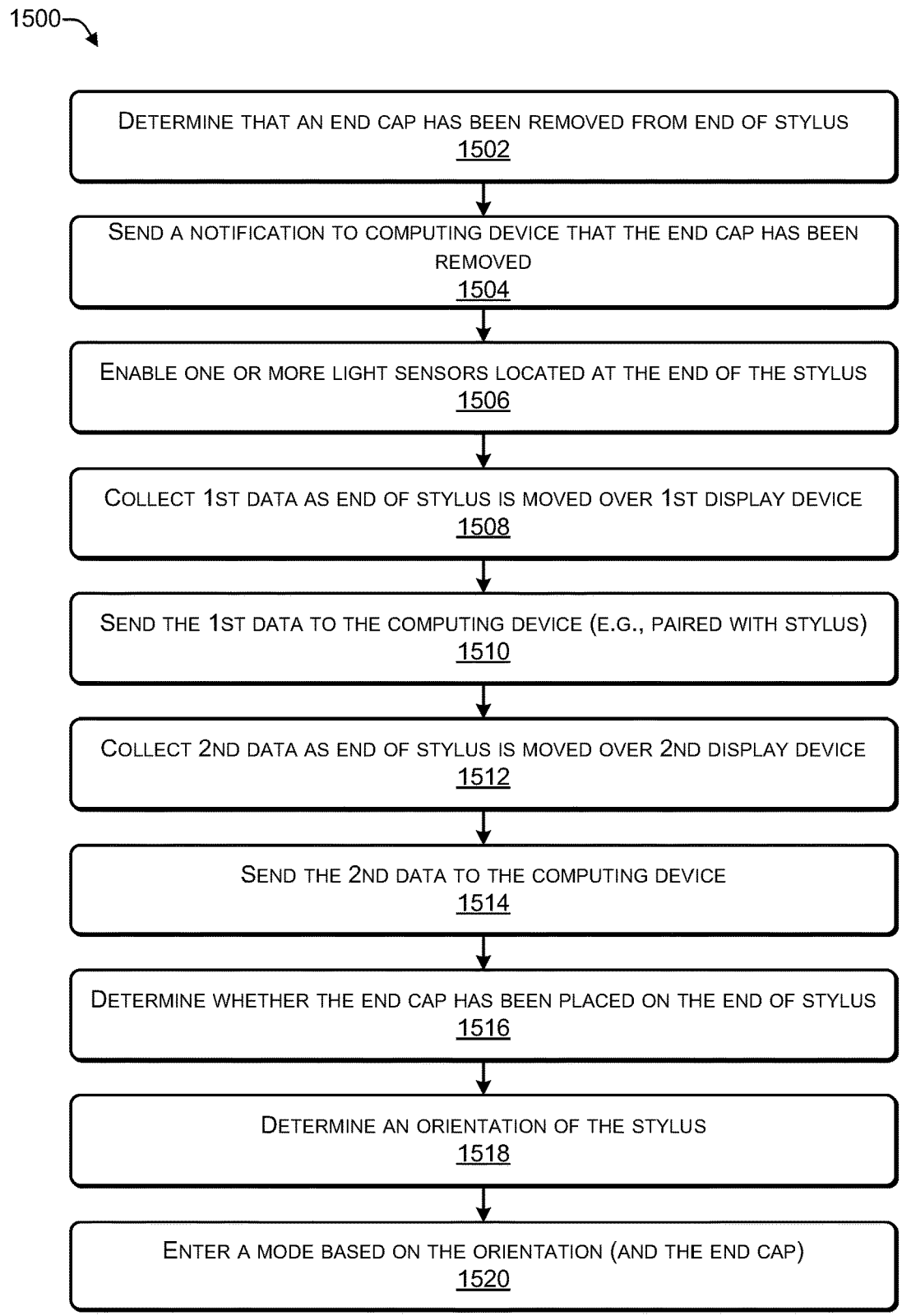
FIG. 15 is a flow chart of a process that includes sending data from a stylus to a computing device according to some embodiments.

In the flow diagrams of FIGS. 13, 14, and 15, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 1300, 1400, and 1500 are described with reference to FIGS. 1, 2, 3, 4, 5, 6, 7, 8, 9, 10, 11, and 12 as described above, although other models, frameworks, systems and environments may be used to implement this process.

FIG. 13 is a flow chart of a process 1300 that includes determining an orientation of a stylus according to some embodiments. The process 1300 may be performed by the stylus 162 of FIGS. 1, 7, 8, 9, 10, 11, and 12 (and as described elsewhere herein).

At 1302, the process may determine an orientation of a stylus. At 1304, the process may determine whether an end cap is present (or absent) on an end of the stylus. For example, in FIGS. 9 and 10, the gyro sensor 1008 may provide sensor data to the MCU 1014 to enable the MCU 1014 to determine an orientation of the stylus 162, e.g., whether the tip 164 is facing down or whether the tip 164 is facing up. The Hall effect sensor 1006 may provide sensor data to the MCU 1014 to enable the MCU 1014 to determine whether the cap 168 is on the end of the stylus 162 (e.g., by determining whether the magnet 170 is present). For example, when the cap 168 is present on the end of the stylus 162, the Hall effect sensor 1006 may detect the presence of the magnet 170 and the MCU 1014 may determine that the cap 168 is present. When the cap 168 is absent from the end of the stylus 162, the Hall effect sensor 1006 may detect the absence of the magnet 170 and the MCU 1014 may determine that the cap 168 is absent.

At 1306, if the process determines that "yes" the tip is down and the end cap is on, then the process may proceed to 1308, where the stylus may enter into a pen mode (e.g., to enable the stylus to be used on a touchscreen display in a manner similar to a pen on paper). The process may then proceed to 1302, e.g., the orientation and the presence or absence of the end cap may be repeatedly determined (e.g., every N milliseconds, N>0). For example, in FIG. 10 and FIG. 11, the pen mode 1102 may be entered when the MCU 1014 determines (based on gyro sensor data) from the gyro sensor 1008 that the tip 164 is facing down and (based on Hall effect sensor data) from the Hall effect sensor 1006 that the end cap 168 is present on the end of the stylus 162. At 1306, if the process determines that the tip is up, the end cap is off, or both, then the process may proceed to 1310.

At 1310, if the process determines that "yes" the tip is up and the end cap is on, then the process may proceed to 1312, where the stylus may enter into an erase mode (e.g., to enable the stylus to be used on a touchscreen display in a manner similar to a pencil eraser on paper). The process may then proceed to 1302 to determine the orientation and the presence or absence of the end cap. For example, in FIG. 10 and FIG. 11, the erase mode 1104 may be entered when the MCU 1014 determines (based on gyro sensor data) from the gyro sensor 1008 that the tip 164 is facing up and (based on Hall effect sensor data) from the Hall effect sensor 1006 that the end cap 168 is present on the end of the stylus 162. At 1310, if the process determines that the tip is down, the end cap is off, or both, then the process may proceed to 1314.

At 1314, if the process determines that "yes" the tip is down and the end cap is off, then the process may proceed to 1316, where the stylus may enter into a color calibration mode (e.g., to enable the sensors in the stylus to be used to reduce perceived color differences between two display devices). The process may then proceed to 1302 to determine the orientation and the presence or absence of the end cap. For example, in FIG. 10 and FIG. 11, the calibration mode 1106 may be entered when the MCU 1014 determines (based on gyro sensor data) from the gyro sensor 1008 that the tip 164 is facing up and (based on Hall effect sensor data) from the Hall effect sensor 1006 that the end cap 168 is absent from the end of the stylus 162. At 1314, if the process determines that the tip is up and the end cap is off, then the process may proceed to 1318.

At 1318, the process may determine that the tip is up and the end cap is off and may proceed to 1320, where the stylus may enter into an ALS mode (e.g., to enable the stylus to be used to measure ambient light striking two display devices to reduce perceived differences). The process may then proceed to 1302 to determine the orientation and the presence or absence of the end cap. For example, in FIG. 10 and FIG. 11, the ALS mode 1108 may be entered when the MCU 1014 determines (based on gyro sensor data) from the gyro sensor 1008 that the tip 164 is facing down and (based on Hall effect sensor data) from the Hall effect sensor 1006 that the end cap 168 is absent from the end of the stylus 162.

FIG. 14 is a flow chart of a process 1400 that includes displaying a pattern on a display device according to some embodiments. The process 1400 may be performed by the computing device 100 of FIGS. 1, 2, 3, 4, 5, 6, 7, 8, 20, and 12 (and as described elsewhere herein).

At 1402, the process may receive an instruction to calibrate (e.g., perform color calibration or ALS calibration) two display devices. At 1404, the process may launch a calibration application. At 1406, a prompt may be displayed instructing a user to remove an end cap from a stylus and orient the stylus in such a way that the end of the stylus is pointing down (e.g., towards the display devices) to enable light sensors in the end of the stylus to gather data from the display devices. For example, in FIGS. 10, 11, and 12, an inexperienced user (e.g., a user who has not used the calibration app 172 frequently) may provide an instruction to the computing device to initiate execution of the calibration app 172. The calibration app 172 may prompt the user to remove the end cap 168 from the stylus 162. An experienced user (e.g., a user who has used the calibration app 172 frequently) may remove the end cap 168 from the end of the stylus 162. The stylus 162 may detect the removal of the end cap 168 and send an instruction to the computing device to initiate execution of the calibration app 172. Thus, in some cases, the calibration app 172 may automatically launch in response to the user removing the end cap 168 from the end of the stylus 162.

For color calibration, the calibration app 172 may prompt the user to orient the stylus 162 in such a way that the sensor portion 912 of the stylus 162 is pointing down (e.g., towards the display devices 102, 104) to enable the sensors 166 in the end of the stylus 162 to gather data from the display devices 102, 104. For ambient light calibration, the calibration app 172 may prompt the user to orient the stylus 162 in such a way that the sensor portion 912 of the stylus 162 is pointing up (e.g., tip pointing towards the display devices 102, 104) to enable the sensors 166 in the end of the stylus 162 to gather ALS data.

At 1408, the process may display a pattern on a first display device. At 1410, the process may display a prompt to trace the pattern on the first display device with the end of the stylus. At 1412, the process may receive first data, associated with the first display device, from the stylus. For example, in FIGS. 10 and 12, the calibration app 172 may display one of the patterns 1202 on the display device 102 and display the prompt 180 asking the user to trace the pattern 1202 with the sensor portion 912 for color calibration or trace the pattern 1202 with the tip 164 for ambient light calibration. The stylus 162 may gather the data 174(1) from the light sensors 1004 when the stylus 162 is tracing the pattern 1202. After the stylus 162 determines that the stylus 162 is no longer moving, the stylus 162 may send the data 174(1) to the calibration app 172 executing on the computing device 100.

At 1414, the process may display the pattern on a second display device. At 1416, the process may display a prompt to trace the pattern on the second display device with the end of the stylus. At 1418, the process may receive second data, associated with the second display device, from the stylus. For example, in FIGS. 10 and 12, the calibration app 172 may, in response to receiving the data 174(1), display one of the patterns 1202 on the display device 104 and display the prompt 180 asking the user to trace the pattern 1202 with the sensor portion 912 for color calibration or trace the pattern 1202 with the tip 164 for ambient light calibration. The stylus 162 may gather the data 174(2) from the light sensors 1004 when the stylus 162 is tracing the pattern 1202. After the stylus 162 determines that the stylus 162 is no longer moving, the stylus 162 may send the data 174(2) to the calibration app 172 executing on the computing device 100.

At 1420, the process may determine and store calibration settings based on the first data (associated with the first display device) and the second data (associated with the second display device). At 1422, the first display device and the second display device may be calibrated based on the calibration settings. For example, in FIG. 1, the calibration app 172 may receive the data 174(1) (associated with the first display device 102) and the data 174(2) (associated with the second display device 104) and determine the calibration data 178 to reduce perceived differences in color (e.g., gamma, chroma, luma, and the like) between the display devices 102, 104. By reducing (or eliminating) perceived differences between the display devices 102, 104 the user experience can be improved because the display devices 102, 104 are perceived by the user as a single screen rather than two disparate screens.

In some cases, to reduce the amount of time to reduce (or eliminate) color differences between two (or more) display devices, one or more gamma lookup tables may be used. Each gamma lookup table may include pre-calculated values that may be used to color correct one of the display devices 102, 104 to closely match in appearance the other of the display devices 102, 104. By pre-calculating the gamma values and looking up the values in a table, the computing device 100 can perform a simple lookup in table rather than evaluating complex mathematical equations in real-time to determine gamma values. Using lookup tables (e.g., for gamma, chroma, and/or luma) may reduce power consumption when determining gamma, chroma, and/or luma values to reduce differences between display devices. For example, a low power CPU may be used because the CPU merely performs a lookup. In contrast, if the CPU were to perform complex mathematical (e.g., floating point) calculations to determine gamma, chroma, and/or luma values, the CPU may consumer more power, thereby reducing battery life.

The gamma level may be used to brighten or darken content displayed by the display devices 102, 104. Adjusting the gamma level changes brightness without shifting the 0 and 255 end points. Thus, adjusting the gamma level may not create clipping and does not cause a shift of dynamic range. If conserving battery life is more important than the quality of the display, then the brightness of the display device that appears brighter may be reduced to match the brightness of the display device that appears less bright. If conserving battery life is less important than the quality of the display, then the brightness of the display device that appears less bright may be increased to match the display device that appears brighter. Examples of Gamma lookup tables, Table 1 and Table 2, are provided below. An output device, such as the display devices 102, 104, may use Table 1 or Table 2 to lookup gamma. Which of the tables is used depends on whether prolonging battery life has the highest priority or providing a vivid and bright display has the highest priority. Thus, the display devices 102, 104 can read Tables 1 and 2 to discard gamma (e.g., to convert and restore linear data prior to displaying it). Thus, even if the CPU 112 does not have the capability to perform floating point multiply and divide, the CPU 112 can perform gamma decoding using Tables 1 and 2. Reading Tables 1 and 2 can be performed quickly even by a relatively slow processor, and does not require the computing device 100 to evaluate complex mathematical equations for thousands or millions of pixels. The manufacturer of the computing device 100 may specify a particular gamma level for each display device. Tables 1 and 2 assume that the manufacturer specifies a Gamma 2.2 level. Of course, different manufacturers may specify different gamma levels (e.g., Gamma 2.0, or the like).

For example, a lookup may be performed as follows. If one display has a gamma of 93, Table 1 may be used to look up row "90:" and col. 3 to retrieve the gamma value 28 or Table 2 may be used to look up row "90:" and col. 3 to retrieve the gamma value 161. Gamma value 28 may be used to reduce brightness of one display (to match the other display) when conserving battery life takes priority while gamma value 161 may be used to increase the brightness of one display (to match the other display) when providing bright, vivid displays takes priority. In some cases, a gamma table may be created for a particular difference range for each of Red, Green, and Blue (RGB).

TABLE 1

8-bit gamma Look Up Table for Decoding
Gamma 2.2 address: Linear output

|  | Col. 0 | Col. 1 | Col. 2 | Col. 3 | Col. 4 | Col. 5 | Col. 6 | Col. 7 | Col. 8 | Col. 9 |
|---|---|---|---|---|---|---|---|---|---|---|
| 0: | 0 | 0 | 0 | 0 | 0 | 0 | 0 | 0 | 0 | 0 |
| 10: | 0 | 0 | 0 | 0 | 0 | 1 | 1 | 1 | 1 | 1 |
| 20: | 1 | 1 | 1 | 1 | 1 | 2 | 2 | 2 | 2 | 2 |
| 30: | 2 | 2 | 3 | 3 | 3 | 3 | 3 | 4 | 4 | 4 |
| 40: | 4 | 5 | 5 | 5 | 5 | 6 | 6 | 6 | 6 | 7 |
| 50: | 7 | 7 | 8 | 8 | 8 | 9 | 9 | 9 | 10 | 10 |
| 60: | 11 | 11 | 11 | 12 | 12 | 13 | 13 | 13 | 14 | 14 |
| 70: | 15 | 15 | 16 | 16 | 17 | 17 | 18 | 18 | 19 | 19 |
| 80: | 20 | 20 | 21 | 22 | 22 | 23 | 23 | 24 | 25 | 25 |
| 90: | 26 | 26 | 27 | 28 | 28 | 29 | 30 | 30 | 31 | 32 |
| 100: | 33 | 33 | 34 | 35 | 35 | 36 | 37 | 38 | 39 | 39 |
| 110: | 40 | 41 | 42 | 43 | 43 | 44 | 45 | 46 | 47 | 48 |
| 120: | 49 | 49 | 50 | 51 | 52 | 53 | 54 | 55 | 56 | 57 |
| 130: | 58 | 59 | 60 | 61 | 62 | 63 | 64 | 65 | 66 | 67 |
| 140: | 68 | 69 | 70 | 71 | 73 | 74 | 75 | 76 | 77 | 78 |
| 150: | 79 | 81 | 82 | 83 | 84 | 85 | 87 | 88 | 89 | 90 |
| 160: | 91 | 93 | 94 | 95 | 97 | 98 | 99 | 100 | 102 | 103 |
| 170: | 105 | 106 | 107 | 109 | 110 | 111 | 113 | 114 | 116 | 117 |
| 180: | 119 | 120 | 121 | 123 | 124 | 126 | 127 | 129 | 130 | 132 |
| 190: | 133 | 135 | 137 | 138 | 140 | 141 | 143 | 145 | 146 | 148 |
| 200: | 149 | 151 | 153 | 154 | 156 | 158 | 159 | 161 | 163 | 165 |
| 210: | 166 | 168 | 170 | 172 | 173 | 175 | 177 | 179 | 181 | 182 |
| 220: | 184 | 186 | 188 | 190 | 192 | 194 | 196 | 197 | 199 | 201 |
| 230: | 203 | 205 | 207 | 209 | 211 | 213 | 215 | 217 | 219 | 221 |
| 240: | 223 | 225 | 227 | 229 | 231 | 234 | 236 | 238 | 240 | 242 |
| 250: | 244 | 246 | 248 | 251 | 253 | 255 | | | | | for (i = 0; i <= 255; i++) { table[i] = Math.round(Math.pow(i/255, 2.2) * 255); }

TABLE 2

8-bit gamma Look Up Table for Encoding
Gamma 2.2 address: Linear output

|      | Col. 0 | Col. 1 | Col. 2 | Col. 3 | Col. 4 | Col. 5 | Col. 6 | Col. 7 | Col. 8 | Col. 9 |
|------|--------|--------|--------|--------|--------|--------|--------|--------|--------|--------|
| 0:   | 0      | 21     | 28     | 34     | 39     | 43     | 46     | 50     | 53     | 56     |
| 10:  | 59     | 61     | 64     | 66     | 68     | 70     | 72     | 74     | 76     | 78     |
| 20:  | 80     | 82     | 84     | 85     | 87     | 89     | 90     | 92     | 93     | 95     |
| 30:  | 96     | 98     | 99     | 101    | 102    | 103    | 105    | 106    | 107    | 109    |
| 40:  | 110    | 111    | 112    | 114    | 115    | 116    | 117    | 118    | 119    | 120    |
| 50:  | 122    | 123    | 124    | 125    | 126    | 127    | 128    | 129    | 130    | 131    |
| 60:  | 132    | 133    | 134    | 135    | 136    | 137    | 138    | 139    | 140    | 141    |
| 70:  | 142    | 143    | 144    | 144    | 145    | 146    | 147    | 148    | 149    | 150    |
| 80:  | 151    | 151    | 152    | 153    | 154    | 155    | 156    | 156    | 157    | 158    |
| 90:  | 159    | 160    | 160    | 161    | 162    | 163    | 164    | 164    | 165    | 166    |
| 100: | 167    | 167    | 168    | 169    | 170    | 170    | 171    | 172    | 173    | 173    |
| 110: | 174    | 175    | 175    | 176    | 177    | 178    | 178    | 179    | 180    | 180    |
| 120: | 181    | 182    | 182    | 183    | 184    | 184    | 185    | 186    | 186    | 187    |
| 130: | 188    | 188    | 189    | 190    | 190    | 191    | 192    | 192    | 193    | 194    |
| 140: | 194    | 195    | 195    | 196    | 197    | 197    | 198    | 199    | 199    | 200    |
| 150: | 200    | 201    | 202    | 202    | 203    | 203    | 204    | 205    | 205    | 206    |
| 160: | 206    | 207    | 207    | 208    | 209    | 209    | 210    | 210    | 211    | 212    |
| 170: | 212    | 213    | 213    | 214    | 214    | 215    | 215    | 216    | 217    | 217    |
| 180: | 218    | 218    | 219    | 219    | 220    | 220    | 221    | 221    | 222    | 223    |
| 190: | 223    | 224    | 224    | 225    | 225    | 226    | 226    | 227    | 227    | 228    |
| 200: | 228    | 229    | 229    | 230    | 230    | 231    | 231    | 232    | 232    | 233    |
| 210: | 233    | 234    | 234    | 235    | 235    | 236    | 236    | 237    | 237    | 238    |
| 220: | 238    | 239    | 239    | 240    | 240    | 241    | 241    | 242    | 242    | 243    |
| 230: | 243    | 244    | 244    | 245    | 245    | 246    | 246    | 247    | 247    | 248    |
| 240: | 248    | 249    | 249    | 249    | 250    | 250    | 251    | 251    | 252    | 252    |
| 250: | 253    | 253    | 254    | 254    | 255    | 255    |        |        |        |        | for (i = 0; i <= 255; i++) { table[i] = Math.round(Math.pow(i/255, 1/2.2) * 255); }

FIG. 15 is a flow chart of a process 1500 that includes sending data from a stylus to a computing device according to some embodiments. The process 1500 may be performed by the stylus 162 of FIGS. 1, 7, 8, 9, 10, 11, and 12 (and as described elsewhere herein).

At 1502, the process may determine that an end cap of a stylus has been removed. At 1504, the process may send a notification to a computing device (e.g., that is paired or associated with the stylus) that the end cap has been removed. At 1506, the process may enable one or more light sensors located at the end of the stylus (that was covered by the end cap). For example, in FIG. 10 and FIG. 12, the user may remove the end cap 168 from the end of the stylus 162 that houses the sensor portion 912. The Hall effect sensor 1006 may detect the absence of the magnet 170 in the end cap 168 and the MCU 1014 may determine that the end cap 168 has been removed. In response to determining that the end cap 168 has been removed, the MCU 1014 may send a notification message to the computing device 100 indicating that the end cap 168 has been removed. The computing device 100 may, after receiving the notification message, automatically initiate execution of the calibration app 172. In response to determining that the end cap 168 has been remove, the MCU 1014 may enable (e.g., provide power to) the light sensors 1004. For example, the light sensors 1004 may be placed in a low power consumption mode to conserve the battery 1022 when the end cap 168 is present on the end of the stylus 162. After the MCU 1014 determines that the end cap 168 has been removed, the MCU 1014 may transition the light sensors 1004 from the low power consumption mode to an active mode.

At 1508, the process may collect first data during a time when the stylus is being moved over (a pattern being displayed on) a first display device. At 1510, after determining that the first data has been gathered, the process may send the first data to the computing device (e.g., that is paired or associated with the stylus). For example, in FIGS. 10 and 12, the stylus 162 may collect the data 174(1) as the user traces over the pattern 1202(1) using the stylus 162. After the stylus 162 determines that tracing the pattern 1202(1) has been completed, the stylus may send the data 174(1) to the computing device 100. For example, the stylus 162 may determine that tracing the pattern 1202(1) has been completed based on one or more of (1) determining that the stylus 162 has stopped moving for more than a predetermined amount of time (e.g., 500 milliseconds (ms), 1 second, 2 seconds, or the like), (2) determining that the light sensors 1004 have read a stop marker included at the end of the pattern (e.g., the "5" of the pattern 1202(1) or the "8" of the pattern 1202(2)), (3) receiving a message (e.g., via NFC, such as Bluetooth®) from the computing device 100 indicating that the pattern 1202(1) has been traced, or any combination thereof.

At 1512, the process may collect second data during a time when the stylus is being moved over (a pattern being displayed on) a second display device. At 1514, after determining that the second data has been gathered, the process may send the second data to the computing device (e.g., that is paired or associated with the stylus). For example, in FIGS. 10 and 12, the stylus 162 may collect the data 174(2) as the user traces over the pattern 1202(2) using the stylus 162. After the stylus 162 determines that tracing the pattern 1202(2) has been completed, the stylus may send the data 174(2) to the computing device 100. For example, the stylus 162 may determine that tracing the pattern 1202(2) has been completed based on one or more of (1) determining that the stylus 162 has stopped moving for more than a predetermined amount of time (e.g., 500 milliseconds (ms), 1 second, 2 seconds, or the like), (2) determining that the light sensors 1004 have read a stop marker included at the end of the pattern (e.g., the "5" of the pattern 1202(1) or the "8" of the pattern 1202(2)), (3) receiving a message (e.g., via NFC, such as Bluetooth®) from the computing device 100 indicating that the pattern 1202(1) has been traced, or any combination thereof. After the first data and the second data have been sent to the computing device, the calibration app may analyze the first data and the second data to determine calibration settings to reduce perceived color differences between the first display device and the second display device. The calibration app may apply the calibration settings to the first and second display devices to reduce differences and improve the user's experience.

At 1516, the process may determine whether the end cap has been placed on the end of the stylus. At 1518, the process may determine an orientation of the stylus. At 1520, the process may enter a mode based on (i) the orientation of the stylus and (ii) the presence (or absence) of the end cap on the end of the stylus. For example, in FIG. 13, the process may determine at 1302 an orientation of a stylus and may determine at 1304 whether an end cap is present (or absent) on an end of the stylus. Based on the orientation and the presence (or absence) of the end cap, the process may enter one of the four modes 1102, 1104, 1106, or 1108 described in FIG. 11.

Figure 16:
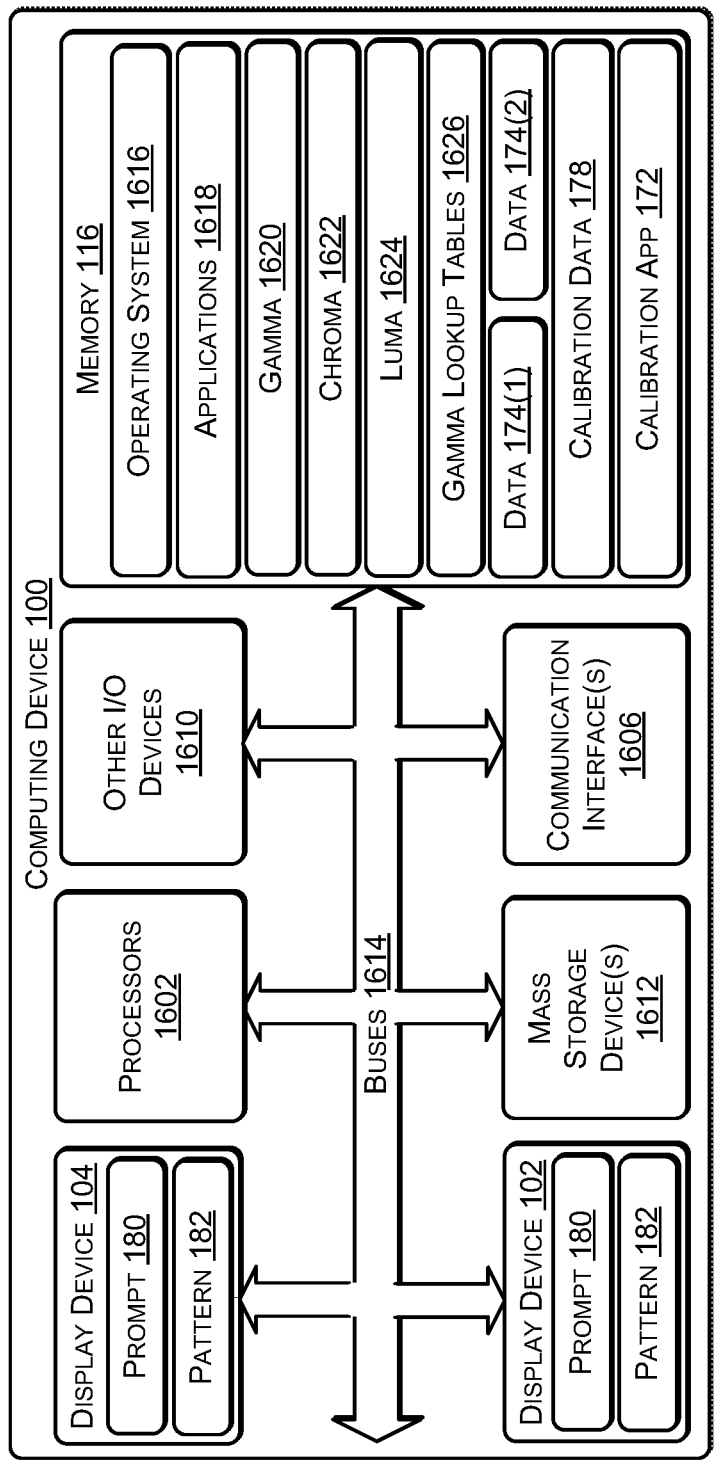
FIG. 16 illustrates an example configuration of a computing device that can be used to implement the systems and techniques described herein.

FIG. 16 illustrates an example configuration of the computing device 100 of FIG. 1 that can be used to implement the systems and techniques described herein. The computing device 100 may include one or more processors 1602 (e.g., the CPU 112 and the GPU 114 of FIG. 1), the memory 116, communication interfaces 1606 (e.g., including the I/O ports 120), the display devices 108, 110, other input/output (I/O) devices 1610 (e.g., keyboard, trackball, and the like, such as the additional components 144), and one or more mass storage devices 1612 (e.g., including the memory 116), configured to communicate with each other, such as via one or more system buses 1614 (e.g., including the data bus 128, 130) or other suitable connections. While a single system bus is illustrated for ease of understanding, it should be understood that the system buses 1614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1602 are one or more hardware devices that may include a single processing unit or a number of processing units, all of which may include single or multiple computing units or multiple cores. The processors 1602 may include the GPU 114 integrated into the CPU 112 or the GPU 114 may be a separate processor device from the CPU 112. The processors 1602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1602 may be configured to fetch and execute computer-readable instructions stored in the memory 116, mass storage devices 1612, or other computer-readable media.

Memory 116 and mass storage devices 1612 are examples of computer storage media (e.g., memory storage devices) for storing instructions that can be executed by the processors 1602 to perform the various functions described herein. For example, memory 116 may include both volatile memory and non-volatile memory (e.g., RAM, ROM, or the like) devices. Further, mass storage devices 1612 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1612 may be collectively referred to as memory or computer storage media herein, and may be any type of non-transitory media capable of storing computer-readable, processor-executable program instructions as computer program code that can be executed by the processors 1602 as a particular machine configured for carrying out the operations and functions described in the implementations herein.

The computing device 100 may also include one or more communication interfaces 1606 for exchanging data via a network. The communication interfaces 1606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1606 can also provide communication with external storage, such as a storage array, network attached storage, storage area network, the cloud storage 232, or the like.

The display devices 102, 104 may be located in the housings 108, 110, respectively, and may be connected using one or more hinges (e.g., the hinges 106 of FIG. 1). The hinges may enable each display device to be placed at an angle between about 0 and about 360 relative to the other display device. For example, the display devices 108, 110 may be used for displaying information and images to users. Other I/O devices 1610 may be devices that receive various inputs from a user and provide various outputs to the user, and may include a keyboard, a touchpad, a mouse, a printer, audio input/output devices, and so forth.

The computer storage media, such as memory 116 and mass storage devices 1612, may be used to store software and data. For example, the computer storage media may be used to store an operating system 1616, one or more applications 1618, gamma 1620, chroma 1622, luma 1624, gamma lookup tables 1626 (e.g., such as, for example, Tables 1 and 2 above), the data 174(1), 174(2), and the calibration data 178. The data 174(1), 174(2) may include data captured by one or more of the light sensors 1004 of FIG. 10. The gamma 1620, the chroma 1622, and the luma 1624 values associated with each of display devices 102, 104 may be determined by the calibration app 172 based on the data 174(1), 174(2). The gamma 1620, the chroma 1622, and the luma 1624 values may be used to make adjustments (e.g., the calibration data 178) to one or both of the display devices 102, 104 to reduce (or eliminate) perceived color differences.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarativetype instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving, by a microcontroller unit of a stylus having a tip and an end, sensor data from a Hall effect sensor that is included in the stylus;
determining, by the microcontroller unit and based on the sensor data, that an end cap that includes magnet has been removed from the end of the stylus;
enabling, by the microcontroller unit, one or more light sensors located in the end of the stylus;
collecting, by the microcontroller unit, first data from the one or more light sensors when the stylus is placed over a first display device of a computing device;
sending, by the microcontroller unit, the first data to the computing device;
collecting, by the microcontroller unit, second data from the one or more light sensors when the stylus is placed over a second display device of the computing device; and
sending, by the microcontroller unit, the second data to the computing device;
wherein the first data and the second data are used by the computing device to perform a color adjustment to at least one of the first display device or the second display device to reduce a perceived color difference between the first display device and the second display device.

2. The method of claim 1, further comprising:
sending, by the microcontroller unit, a notification from the stylus to the computing device indicating that the end cap has been removed;
wherein the notification causes the computing device to initiate execution of a calibration application.

3. The method of claim 1, further comprising:
determining, by the microcontroller unit, that the end of the stylus is facing downwards before collecting the first data from the one or more light sensors.

4. The method of claim 1, wherein enabling the one or more light sensors located in the end of the stylus comprises:
transitioning, by the microcontroller unit, the one or more light sensors from a low power consumption mode to an active mode.

5. The method of claim 1, wherein the stylus further comprises:
a lens to magnify and diffuse light entering into the end of the stylus before the light strikes the one or more light sensors.

6. The method of claim 1, wherein the stylus further comprises:
a light filter to filter out frequencies below about 430 terahertz (THz) and above about 770 THz before the light strikes the one or more light sensors.

7. The method of claim 1, wherein collecting the first data from the one or more light sensors comprises:
determining that the stylus is moving over an external surface of the first display device;
initiating collection of the first data;
determining that the stylus has stopped moving for more than a predetermined time period; and
stopping collection of the first data.

8. A stylus comprising:
a tip;
a barrel located next to the tip, the barrel comprising:
a circuit comprising:
a microcontroller unit capable of executing logic instructions;
a near field communication interface to enable the stylus to wirelessly communicate with another device;
one or more light sensors;
a Hall-effect sensor; and
a gyroscope sensor to provide gyro data, wherein the microcontroller unit determines an orientation of the stylus based on the gyro data;
a toroidal-shaped cushion protruding from the barrel, the toroidal-shaped cushion comprising:
a material that can be dragged along an outer surface of a display device without permanently damaging the outer surface of the display device; and
an opening through which light travels to strike the one or more light sensors; and
an end cap that can be placed over or removed from an end of the stylus that is opposite the tip, the end cap including a magnet.

9. The stylus of claim 8, wherein the microcontroller unit:
determines a presence of the end cap on an end of the stylus based on the Hall effect sensor detecting the magnet in the end cap; and
determines a removal of the end cap from the end of the stylus based on the Hall effect sensor detecting an absence of the magnet in the end cap.

10. The stylus of claim 8, wherein:
a light filter, to filter out frequencies below about 430 terahertz (THz) and above about 770 THz, is located between the one or more light sensors and the toroidal-shaped cushion.

11. The stylus of claim 8, wherein:
a lens, to magnify and diffuse the light before the light strikes the one or more light sensors, is located between the one or more light sensors and the toroidal-shaped cushion.

12. The stylus of claim 8, further comprising:
at least one battery to power the circuit.

13. The stylus of claim 8, wherein:
in response to the microcontroller unit determining that the end cap is placed over the end of the stylus and the tip is pointing downward, entering a pen mode to enable the tip to be moved over a touchscreen display device to provide input;

in response to the microcontroller unit determining that the end cap is placed over the end of the stylus and the tip is pointing upward, entering an erase mode to enable the end of the stylus to be moved over the touchscreen display device to selectively remove previously provided input;

in response to the microcontroller unit determining that the end cap has been removed from the end of the stylus and the tip is pointing upward, entering a color calibration mode to enable the end of the stylus to be moved over the touchscreen display device to gather color data emitted by the touchscreen display device; and in response to the microcontroller unit determining that the end cap has been removed from the end of the stylus and the tip is pointing downward, entering an ambient light calibration mode to enable the tip of the stylus to be moved over the touchscreen display device to gather ambient light data associated with ambient light falling on the touchscreen display device.

14. A computing device comprising:
a first touchscreen display device;
a second touchscreen display device;
one or more processors; and
one or more non-transitory computer-readable storage media to store instructions executable by the one or more processors to perform operations comprising:
receiving a notification from a stylus that an end cap has been removed from an end of the stylus;
initiating execution of a calibration application based on receiving the notification;
displaying a pattern on the first touchscreen display device;
receiving first data associated with the first touchscreen display device from the stylus;
stopping displaying the pattern on the first touchscreen display device;
displaying the pattern on the second touchscreen display device;
receiving second data associated with the second touchscreen display device from the stylus;
determining one or more differences between the first data and the second data;
performing one or more color adjustments to at least one of the first touchscreen display device or the second touchscreen display device based on the one or more differences; and
reducing a difference in a color rendering between the first touchscreen display device and the second touchscreen display device.

15. The computing device of claim 14, wherein performing the one or more color adjustments comprises:
adjusting one or more of a gamma value, a chroma value, or a luma value associated with at least one of:
the first touchscreen display device; or
the second touchscreen display device.

16. The computing device of claim 14, wherein:
the stylus is paired with the computing device using a near field communication technology.

17. The computing device of claim 14, wherein displaying the pattern on the first touchscreen display device comprises:
displaying the pattern that includes locations near four corners and a center of the first touchscreen display device.

18. The computing device of claim 14, wherein:
the end of the stylus includes one or more light sensors to:
gather the first data that measures the color rendering of the first touchscreen display device; and
gather the second data that measures the color rendering of the second touchscreen display device.

19. The computing device of claim 14, wherein:
the end of the stylus includes a Hall effect sensor;
the end cap includes a magnet; and
a microcontroller unit in the stylus determines the end cap has been removed from the end of the stylus based on the Hall effect sensor determining an absence of the magnet.

20. The computing device of claim 14, the operations further comprising:
displaying a prompt instructing the user to:
orient the stylus with the tip up; and
trace the pattern using the tip of the stylus.

* * * * *